US007339869B2

United States Patent
Ishibashi et al.

(10) Patent No.: US 7,339,869 B2
(45) Date of Patent: Mar. 4, 2008

(54) OPTICAL DISK AND OPTICAL METHOD

(75) Inventors: Kenzo Ishibashi, Osaka (JP); Yasumori Hino, Nara (JP); Takahiro Nagai, Osaka (JP); Hideshi Ishihara, Osaka (JP); Shinichi Tanaka, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 781 days.

(21) Appl. No.: 10/479,356

(22) PCT Filed: Sep. 24, 2002

(86) PCT No.: PCT/JP02/09779

§ 371 (c)(1),
(2), (4) Date: May 4, 2004

(87) PCT Pub. No.: WO03/030167

PCT Pub. Date: Apr. 10, 2003

(65) Prior Publication Data
US 2004/0196759 A1    Oct. 7, 2004

(30) Foreign Application Priority Data
Sep. 28, 2001  (JP) ............................. 2001-301729

(51) Int. Cl.
*G11B 11/03* (2006.01)
(52) U.S. Cl. .............................. 369/53.21; 369/47.55; 369/59.25
(58) Field of Classification Search ...................... None
See application file for complete search history.

(56) References Cited

FOREIGN PATENT DOCUMENTS

| EP | 1 054 314 | 11/2000 |
|---|---|---|
| EP | 1128598 A1 | 8/2001 |
| JP | 7-221751 | 8/1995 |
| JP | 10-3746 | 1/1998 |
| JP | 2000-113048 A | 4/2000 |
| JP | 2000-122537 A | 4/2000 |
| JP | 2000-298974 A | 10/2000 |
| JP | 2000-332742 A | 11/2000 |
| JP | 2001-57019 A | 2/2001 |
| JP | 2001-83874 A | 3/2001 |
| JP | 2001-92880 A | 4/2001 |
| WO | WO 01/30019 A1 | 4/2001 |

OTHER PUBLICATIONS

International Search Report for PCT Application No. PCT/JP02/09779 mailed Dec. 3, 2002 with English translation of Form PCT/ISA/210.

*Primary Examiner*—Paul W. Huber
(74) *Attorney, Agent, or Firm*—RatnerPrestia

(57) ABSTRACT

An optical disk according to the present invention is the optical disk on which secret information on unique information given to a specific optical disk manufacturer or a specific optical disk and information recorded on an infringement disk list of identifying an illegitimate optical disk manufacturer or an illegitimate optical disk are recorded in advance, and the optical disk has an area in which reproduction-only encrypted data encrypted based on the secret information and the information on the infringement disk list is recorded in advance or an area capable of recording the encrypted data to be encrypted based on the secret information and the information on the infringement disk list.

8 Claims, 14 Drawing Sheets

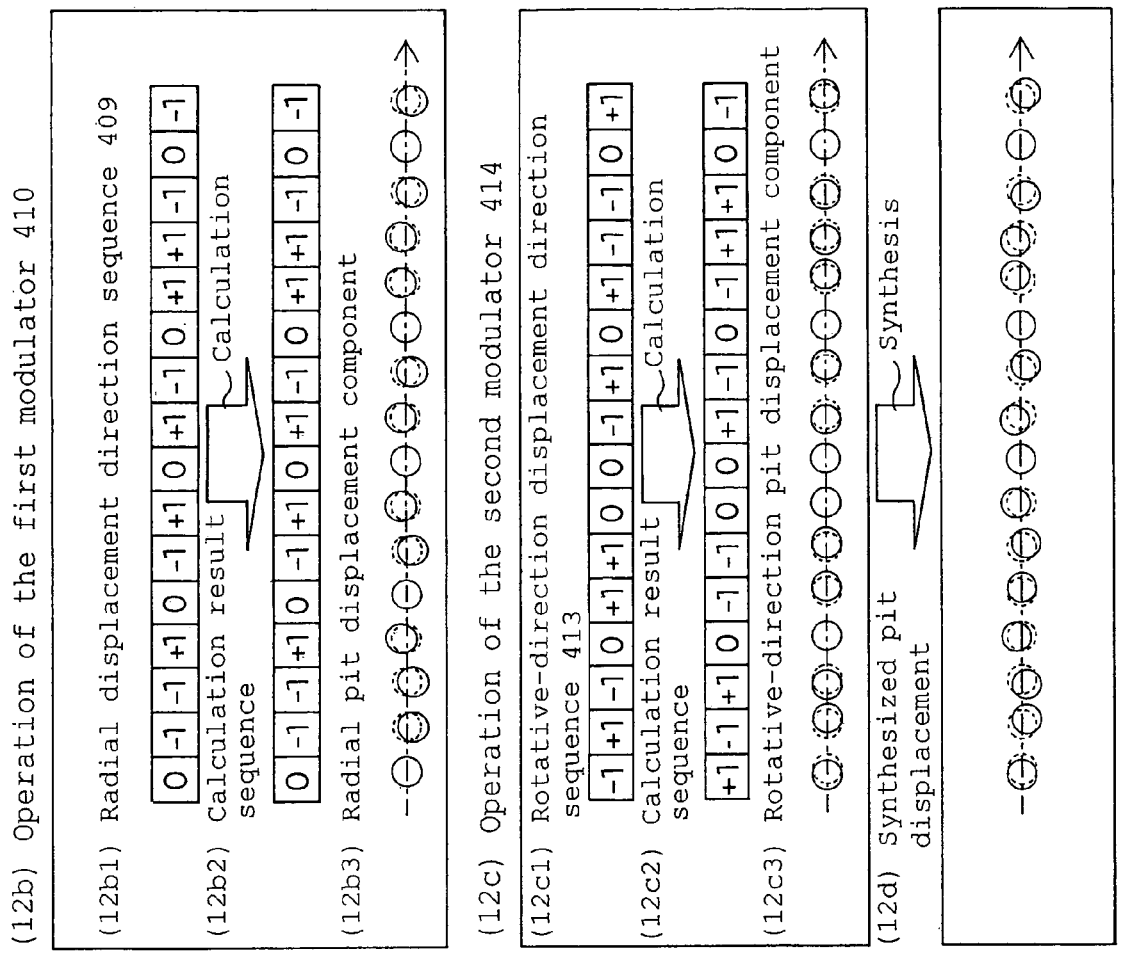
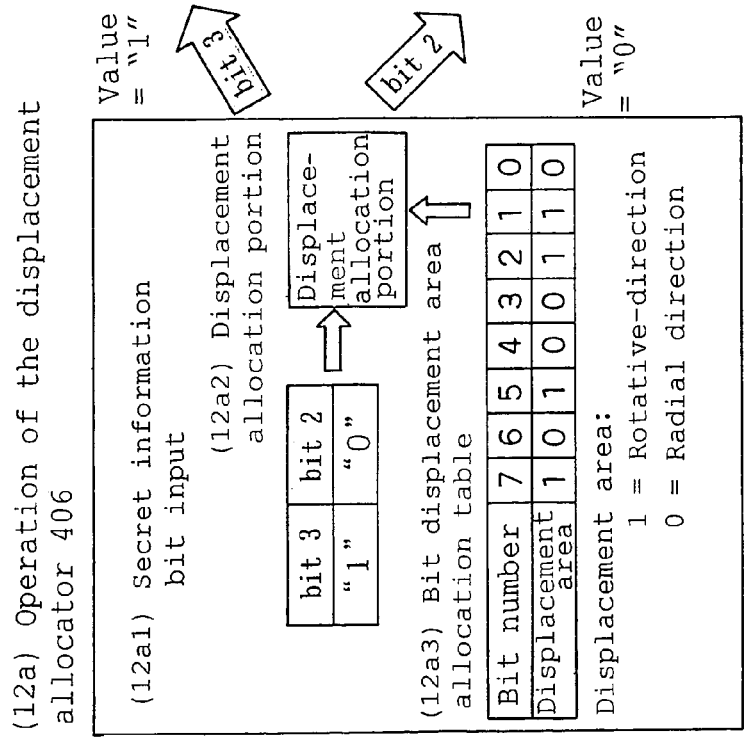
Fig. 12

Fig. 14
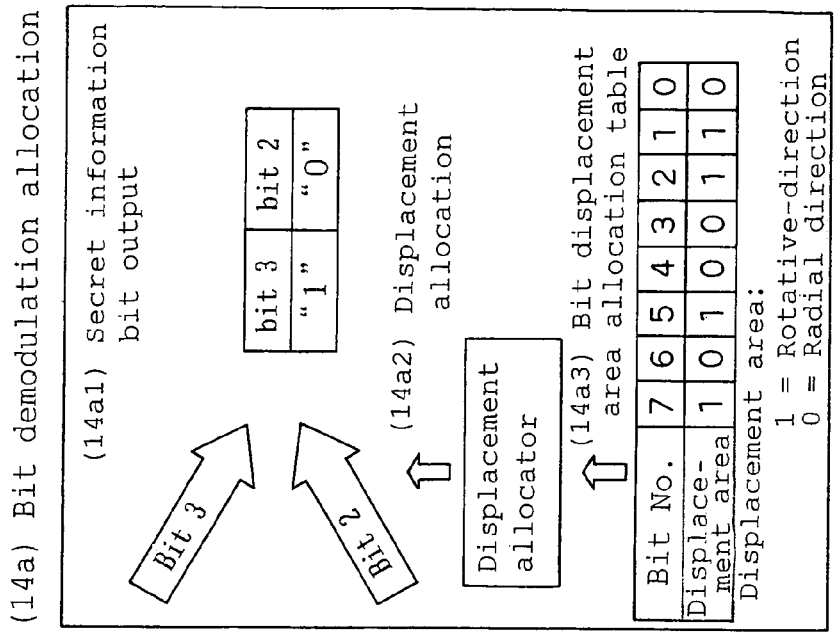
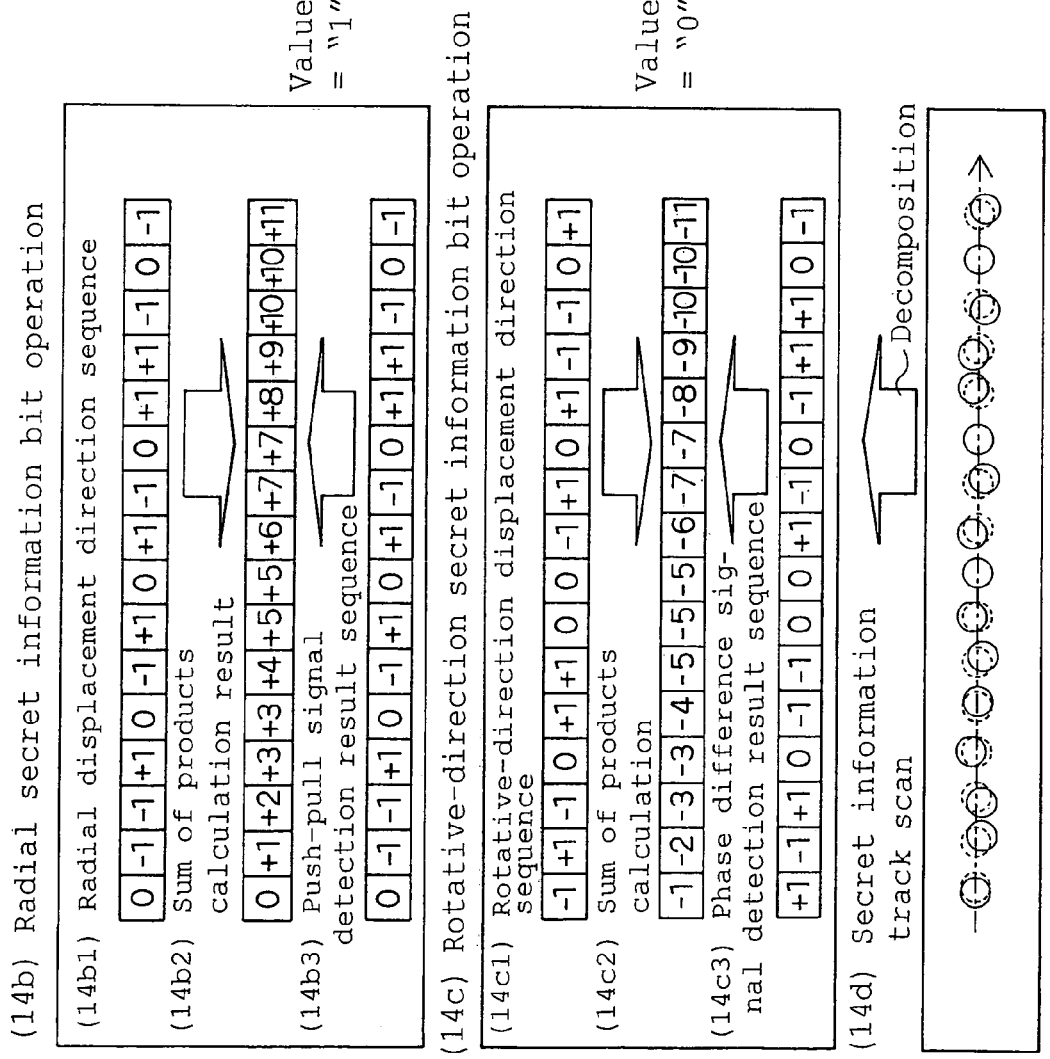

OPTICAL DISK AND OPTICAL METHOD

This Application is a U.S. National Phase Application of PCT International Application PCT/JP02/09779.

1. Technical Field

The present invention relates to an optical disk and method capable of, for instance, preventing distribution of pirated optical disks.

2. Background Art

In recent years, optical disks are very actively applied to AV (Audio Visual) and PC (Personal Computer) fields. For instance, a CD (Compact Disc) developed for music underwent further development as a playback-only CD-ROM providing a program and an application for the PC. It was also developed as a CD-R on which data is recordable and a CD-RW on which the data is rewritable so that it has become an optical disk format widely used in the AV and PC fields.

Advancement of densification technology in recent years allowed rapid expansion of playback-only DVD (Digital Versatile Disc) format capable of recording images of a movie and so on. As for the DVD, recordable and rewritable formats such as DVD-R, DVD-RAM and DVD-RW have been also developed. This optical disk format has spread at an accelerated pace.

It is expected that, as the densification technology is further developed in the future, an optical disk format of a higher capacity and a smaller optical disk format of the same capacity will be developed so as to appear on the market as optical disk systems for cultivating new AV uses.

In the case of developing, manufacturing and selling the optical disks and optical disk drives related to the above CD and DVD formats, the intellectual property is normally licensed by a license administrative organization founded by a developer or an organization having developed the above CD and DVD formats. The object is that the manufacture and sale of the optical disks and optical disk drives should provide for adequate licensing fees. This is an ideal and required situation in view of sound advancement of the industry.

Regretfully, however, the optical disks and optical disk drives in so-called pirated CD and DVD formats have been manufactured and sold by offenders without obtaining a license and/or without paying licensing fees. For that reason, given the present circumstances, there has been distribution of pirated products unreasonably lower-priced than the products produced under license in the market so that a licensee suffers an unreasonable loss. In addition, the rights of a licensor are also conspicuously jeopardized by suffering an unreasonable loss in being unable to collect investment in development as a result of the absence of payment of the licensing fees. The licensee loses trust and the industry suffers.

Although DVDs already have a technological mechanism for protecting copyrights of the movies and music recorded thereon, there is a problem that a portion thereof is exposed by assault of hackers. Hackers have reproduced software illegally incorporating or bypassing copyright protection technology and has been distributed on the Internet. Furthermore, there is a situation in which the pirated-version DVD disks using it are distributed and the pirated-version DVD disks created in large quantities by so-called bit-by-bit copying. Thus the pirated versions can be easily marketed, impairing the licensors and the interests of the copyright holders of movies.

Amid such circumstances, electronic distribution of higher-quality images and music and high-performance PC programs are receiving attention and being considered as next-generation optical disk uses.

However, trust in the optical disks will be lost if the pirated versions are easily created without being licensed and the contents in the optical disks are easily copied as previously described. For that reason, it is feared that the optical disks may not be used in the electronic distribution. Blocking the distribution of the pirated versions and preventing loss of opportunities are important objects which should be attained on all accounts by the next-generation optical disk system.

To attain the above objects in the past, the present invention is intended to provide the optical disk capable of blocking the distribution of illegitimate optical disks and/or optical disk drives more efficiently than before.

DISCLOSURE OF THE INVENTION

In consideration of the above objects in the past, an object of the present invention is to provide an optical disk capable of blocking distribution of illegitimate optical disks and/or optical disk drives more efficiently than before and usable for construction of a license protection system of the optical disks and/or optical disk drives.

To achieve the above object, a first aspect of the present invention is an optical disk on which first information relating to unique information given to a specific optical disk manufacturer or a specific optical disk and second information of identifying an illegitimate optical disk manufacturer or an illegitimate optical disk are recorded in advance, wherein said optical disk comprises an area in which encrypted data encrypted based on said first and second information is recorded in advance or an area capable of recording the data to be encrypted based on said first and second information.

A second aspect of the present invention is the optical disk according to the first aspect of the present invention, wherein third information relating to the unique information given to a specific optical disk drive manufacturer or a specific optical disk drive is recorded on said optical disk in advance and said third information is also used for said encrypting.

A third aspect of the present invention is the optical disk according to the second aspect of the present invention comprising an area capable of recording as fourth information the information corresponding to said optical disk manufacturer determined to be illegitimate or said optical disk drive determined to be illegitimate, said fourth information also being used for said encrypting.

BRIEF DESCRIPTION OF THE DRAWINGS

FIG. 12 is a diagram for explaining operation of the secret information recording system according to the embodiment of the present invention.

FIG. 14 is a diagram for explaining the operation of the secret information reproduction system according to the embodiment of the present invention.

DESCRIPTION OF THE SYMBOLS

Figure 1:
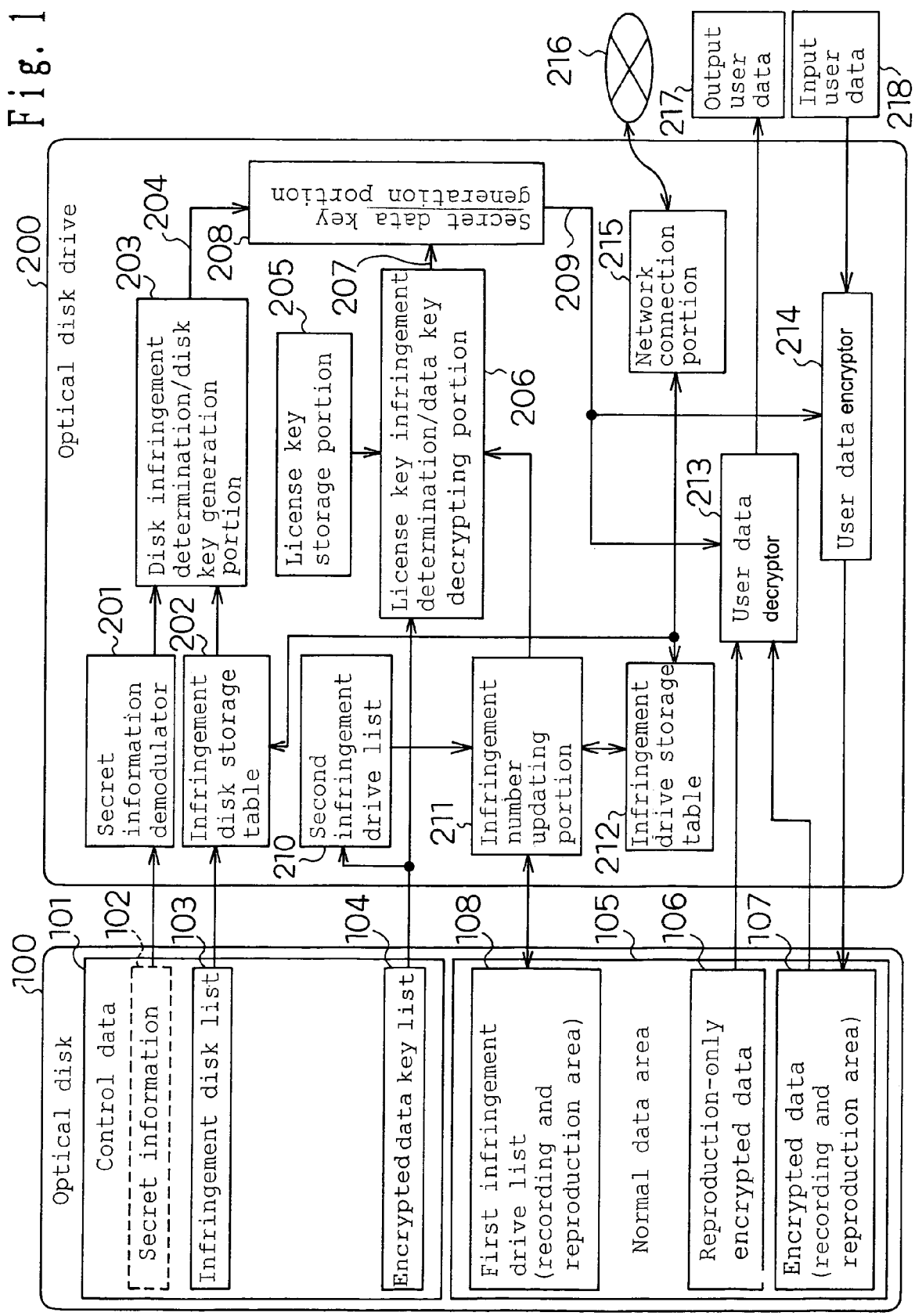
FIG. 1 is a block diagram showing the entire license protection system of an optical disk and an optical disk drive according to an embodiment of the present invention.

1 First wobble pit
2 Second wobble pit
3 Address pit
4 Emboss data pit
5 Head unique length mark
6 End unique length mark
7 Groove
8 Recording and reproduction light beam
100 Optical disk
101 Control data
102 Secret information
103 Infringement disk list
104 Encrypted data key list
105 Normal data area
106 Reproduction-only encrypted data
107 Encrypted data
108 First infringement drive list
200 Optical disk drive
201 Secret information demodulator
202 Infringement disk storage table disk
203 Disk infringement determination/disk key generation portion
204 Disk key
205 License key storage portion
206 License key infringement determination/data key decrypting portion
207 Data key
208 Secret data key generation portion
209 Secret data key
210 Second infringement drive list
211 Infringement number updating portion
212 Infringement drive storage table
213 User data decryptor
214 User data encryptor
215 Network connection portion
216 Internet
217 Output user data
218 Input user data
300 License administrative organization
301 Optical disk manufacturer
302 LSI manufacturer
303 Optical disk drive manufacturer
401 Secret key
401*a* Maker ID
401*b* Formatter ID
401*c* Cutting NO
402 Encryptor
403 Encrypting key
404 ECC recording portion
405 Secret information bit string
406 Displacement allocator
407 First initial value
408 First random number generator
409 Radial displacement direction sequence
410 First modulator
411 Second initial value
412 Second random number generator
413 Rotative-direction displacement direction sequence
414 Second modulator
415 Format timing generator
416 Phase shifter
417 Adder
418 Cutting machine
419 Optical disk master
420 Timing signal
421 Optical modulation signal
422 Optical deflection signal
502 Decryptor
503 Decrypting key
504 ECC reproduction portion
505 Secret information bit string
506 Bit allocator
510 First sum of products computing unit/bit determiner
514 Second sum of products computing unit/bit determiner
515 Address reading/data reproduction portion
516 Push-pull detection portion
517 Phase difference detection portion
518 Optical head
520 Timing signal
521 Push-pull signal
522 Addition signal

BEST MODE FOR CARRYING OUT THE INVENTION

Hereafter, an embodiment of the present invention will be described by referring to the drawings.

The embodiment described below shows an example of a license protection system of protecting both licenses of the optical disk and optical disk drive according to the present invention. This example includes an example of the optical disk and optical disk drive comprising the system.

1. Regarding License Protection of the Optical Disk:

In FIG. 1, 100 is a rewritable optical disk comprised of control data 101 and a normal data area 105.

The control data 101 is control information related to recording and reproduction operation of an optical disk drive 200 which is recorded by an embossed pre-pit, and is comprised of secret information 102, an infringement disk list 103 and an encrypted data key list 104 and so on as to the present invention.

The secret information 102 cannot be read by control data reproduction means of reading a normal pre-pit as described later. The normal data area 105 is comprised of reproduction-only encrypted data 106 placed in the reproduction-only area, encrypted data 107 placed in the recording and reproduction area and a first infringement drive list 108 placed in the recording and reproduction area and so on as to the present invention. The reproduction-only area has the information recorded thereon by the pre-pit, and the recording and reproduction area has the information recorded thereon by a phase change or magneto optical mark formation.

The control data 101 has the control information on recording power and so on recorded therein in addition to the above, and the normal data area 105 has an area of alternation process management information and so on set up in addition to the above. However, their illustration and description will be omitted since they are not directly related to the invention.

The present invention uses processes of encrypting information and decrypting it to reconstitute it, which can be performed by an ordinary encrypting method.

For instance, it is possible to use a publicly known DES (Data Encryption Standard) algorithm (common key system) which is a block encrypting method using an effective 56-bit length key. Although the encrypting method is related to the present invention, the number of bits of the key and encrypting strength based thereon, a description of the contents thereof will be limited to the gist of the invention and a detailed description will be omitted.

The encrypting and decrypting are used at a plurality of points in the description of the embodiment. The encrypting and decrypting in each case may be either the same method or a different method, which should be determined by a licensor in view of a level of confidentiality and implementation costs.

Hereafter, the contents of the information on an optical disk 100 will be described.

Reproduction-only encrypted data 106 is reproduction-only user data, and encrypted data 107 is rewritable user data. On reproduction, both the data is decrypted by an optical disk drive 200, and is outputted as output user data 217. When recording input user data 218, it is encrypted by the optical disk drive 200, and is recorded as the encrypted data 107.

According to the recording method of this embodiment, all the user data on the optical disk 100 is encrypted and recorded, and needs to be decrypted on reproduction.

Although an ordinary optical disk system generally encrypts and records the copyright-protected contents, but does not encrypt general data and free contents not related to the copyright.

It is the point of the present invention to also encrypt and record such contents. It is also possible to record a part of the data in plain text inversely without encrypting it according to a separately established rule. However, a description will be given here on the assumption that all the user data is encrypted.

As for the contents to be copyright-protected, an encrypting process entirely different from the present invention or the encrypting process associated with the present invention is performed in addition to the above encrypting process so as to ensure security comparable with a required level of a contents holder. However, concrete contents thereof will not be referred to because they are different from the gist of the present invention.

While a recording and reproduction method of secret information 102 will be described in detail later, the secret information 102 is the information having the embossed pre-pit embedded therein by a special method of minutely displacing it at a level having no influence over ordinary pre-pit reproduction. And the information cannot be reproduced by ordinary reproduction means, but requires special reproduction means to reproduce it.

In general, there are the following two methods of duplicating the optical disk. One is a method called "RF copy duplication" whereby an RF signal is reproduced and binarized to directly cut an optical disk master with the binarized signal, and the optical disk is duplicated from a stamper created therefrom.

The other is a method called "copy stamper duplication" whereby a copy stamper is created by using a commercial optical disk as a mother to duplicate the optical disk.

However, in the case of the duplication by the former method, the secret information 102 recorded by the special method unique to this invention is missed in the stage of the binarization process and becomes irreproducible. In the case of the duplication by the latter method, the secret information 102 has the signal buried in noise and missed due to deformation of the pre-pit when creating the copy stamper so that it also becomes irreproducible.

The secret information 102 constitutes a part or all of key information necessary for decrypting and encrypting of the above described user data.

Therefore, the above described key information cannot be obtained on a pirated optical disk in which the secret information 102 is not embedded so that the user data cannot be decrypted or encrypted thereon. Also, a pirated optical disk drive having no means of reproducing the secret information cannot obtain the key information, and besides, it cannot decrypt or encrypt the user data because it has no decrypting and encrypting means.

Thus, it becomes possible to eliminate the pirated optical disks and optical disk drives, which is the object of the present invention.

The value of the secret information 102 is a different value for each cutting of a master of the optical disk 100, and is provided from a license administrative organization founded by a licensor (a person who grants a license).

The information on the decrypting and encrypting means or circuit information for the sake of implementing LSI is also provided from the license administrative organization to a licensee (a person who is licensed) A relationship between the license administrative organization and optical disk, LSI and optical disk drive manufacturers who are the licensees will be described later by using FIG. 5.

The infringement disk list 103 is intended to provide the information on the optical disks or optical disk drive manufacturers infringing on the license to the optical disk drive 200, which is a list describing the secret information recorded on the infringement optical disks. The license administrative organization performs a follow-up research as to whether or not there is unjust distribution of the optical disks in the market.

And in the case of finding the illegitimate infringement optical disks, the list describing the secret information on the infringement optical disks is created, which will be provided to a legitimate optical disk manufacturer.

The encrypted data key list 104 is created by the License administrative organization, and is provided to the optical disk manufacturer. The encrypted data key list 104 is a part of the information used for encrypting and decrypting of the above described user data, and is used when cutting the master of the optical disk 100.

Hereafter, a creation process of an encrypted data key list 104b in the License administrative organization will be described by using the example shown in a pattern diagram in FIG. 2.

First, the License administrative organization determines one data key 207a for each cutting of the master of the optical disk 100. The data key 207a is decrypted in the optical disk drive 200, and is used for the encrypting and decrypting of the user data. The License administrative organization determines a plurality of different license keys, and renders them as a license key list 205a (there are n pieces of key in FIG. 2).

Next, the License administrative organization uses each license key in the license key list 205a to encrypt the data key 207a with a data key encryptor 206a so that a consequent listing of a plurality of encrypted data keys is rendered as a first encrypted data key list 104a.

Figure 2:
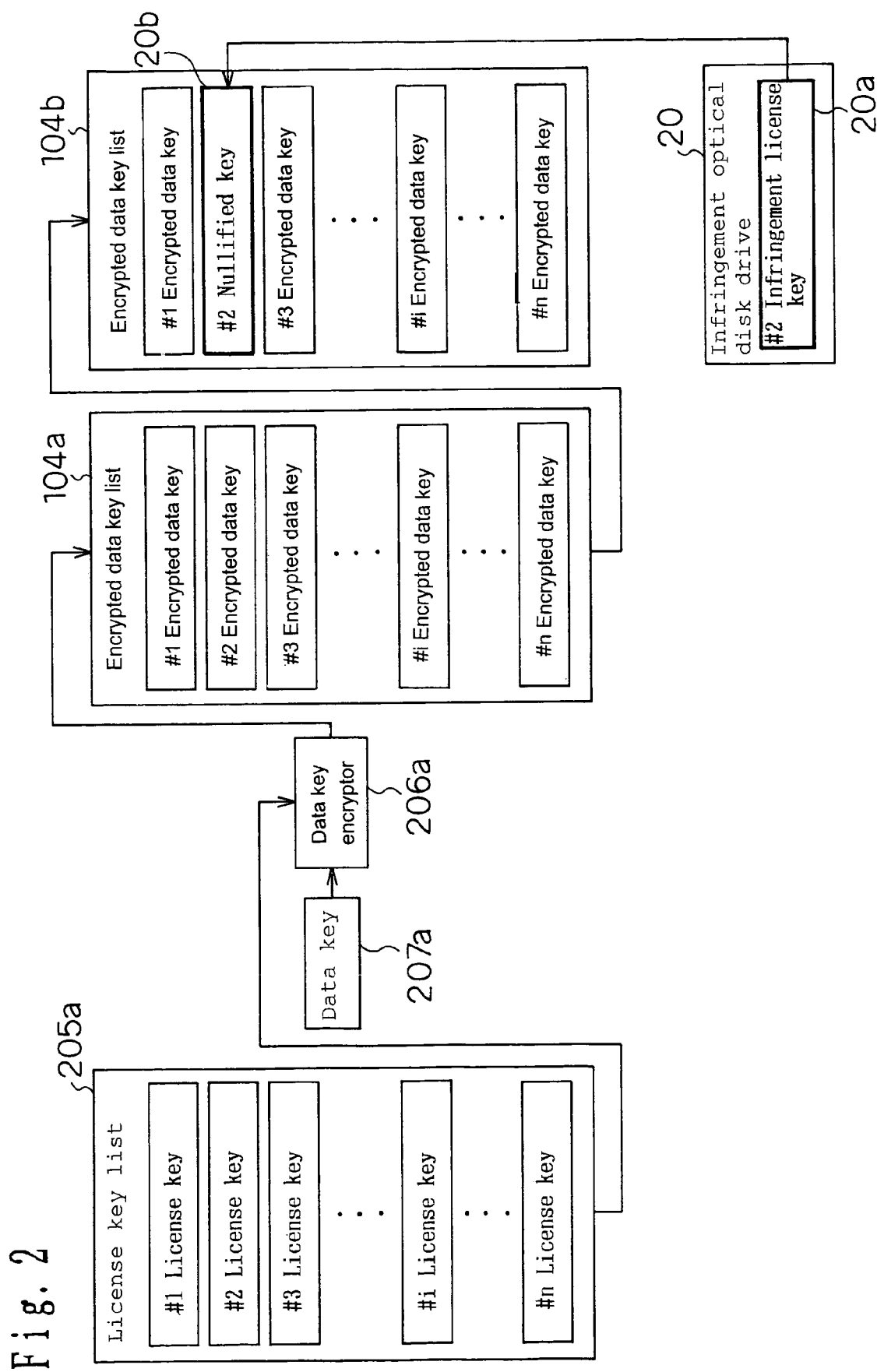
FIG. 2 is a diagram showing a configuration example of an encrypted data key list according to the embodiment of the present invention.

There is a data structure wherein the encrypted data keys in the list and the license keys used to encrypt them are corresponding by the numbers given them respectively (#1, #2, #3, . . . , #i, . . . , #n in FIG. 2).

The License administrative organization causes one or more license keys extracted from the above described plurality of different license keys by a predetermined rule to be stored as legitimate license keys by a license key storage portion 205 provided inside the optical disk drive 200 of the licensee.

As for how to have them stored, the License administrative organization determines allocation thereof, such as a different method for each optical disk drive or the same method per lot (a unit of several hundred pieces for instance). It is assumed that the pirated optical disk drives are created by exposing the license keys of a legitimate optical disk drives. In that case, according to this embodiment, the exposed license key is nullified so as to render the pirated optical disk drives unusable.

In this case, the legitimate optical disk drives exposed at the same time are also rendered unusable, and so the quantity thereof should not be set so large in consideration of this.

To decrypt and encrypt the user data encrypted on the optical disk 100, the optical disk drive 200 finds the encrypted data keys corresponding to the legitimate license keys from the above described corresponding numbers, and decrypts the data keys 207 by a decrypting process using the above described legitimate license keys so as to utilize them for the encrypting and decrypting of the user data.

Here, in the case where the License administrative organization finds the optical disk drive infringing on the license (an infringement optical disk drive 20 in FIG. 2), all the license keys stored on the infringement optical disk drive 20 (only one piece of #2 infringement license key 20a in FIG. 2) are nullified.

From the first encrypted data key list 104a created as described above, the License administrative organization renders as a nullified key the encrypted data key corresponding to the infringement license key (only one piece of #2 infringement license key 20a in FIG. 2) based on the corresponding number (#2 nullified key 20b in FIG. 2).

Thus, the encrypted data key list 104b updated by the License administrative organization is provided to the optical disk manufacturer. And the information on the encrypted data key list 104b is recorded on the optical disk master.

Consequently, it is recorded in the area of the control data 101 of the optical disk 100 as the encrypted data key list 104 in FIG. 1.

Apart from this, the first infringement drive list 108 is constituted so that, even after the optical disks 100 are distributed in the market, as many numbers of infringement license keys to the optical disk drives infringing on the license (also merely referred to as the drives) can be recorded by the optical disk drives. The details of this will be described by referring to FIG. 4 later.

Returning to the optical disk drive 200 in FIG. 1, the inside thereof will be described in detail. The optical disk drive 200 is comprised of the following components.

To be more specific, it is comprised of a secret information demodulator 201 of reproducing the secret information 102 from the optical disks 100, an infringement disk storage table 202, a disk infringement determination/disk key generation portion 203, a license key storage portion 205, a license key infringement determination/data key decrypting portion 206, a secret data key generation portion 208, a second infringement drive list 210, an infringement number updating portion 211, an infringement drive storage table 212, a user data decryptor 213, a user data encryptor 214 and a network connection portion 215.

The contents illustrated as to the optical disk drive 200 are limited to the portions related to the present invention and requiring a description, where the general components in the public domain such as the optical head, signal processing portion, servo portion, error correction portion and system control portion involved in recording and reproduction are not shown. Reference numeral 216 denotes the Internet connected to the network connection portion 215.

First, the secret information 102 will be described by referring to FIG. 3. The secret information 102 demodulated by the secret information demodulator 201 has a code for error detection and correction added thereto, and is sent to the disk infringement determination/disk key generation portion 203 to have an error correction process performed so that it is taken out as secret information 102a (information contents are "Sx").

The data of the infringement disk list 103 is reproduced by an ordinary control data reproduction means (not shown). In an infringement disk list 103a in FIG. 3, only one disk having secret information "S7" is recorded as an infringement disk on the list, and other columns thereof have "NULL" representing emptiness.

The infringement disk storage table 202 is a nonvolatile memory, which is a memory including write-once means of sequentially writing once the secret information 102 of the infringement disk not entered each time the information on the infringement disk is reproduced on the optical disk drive 200.

Figure 3:
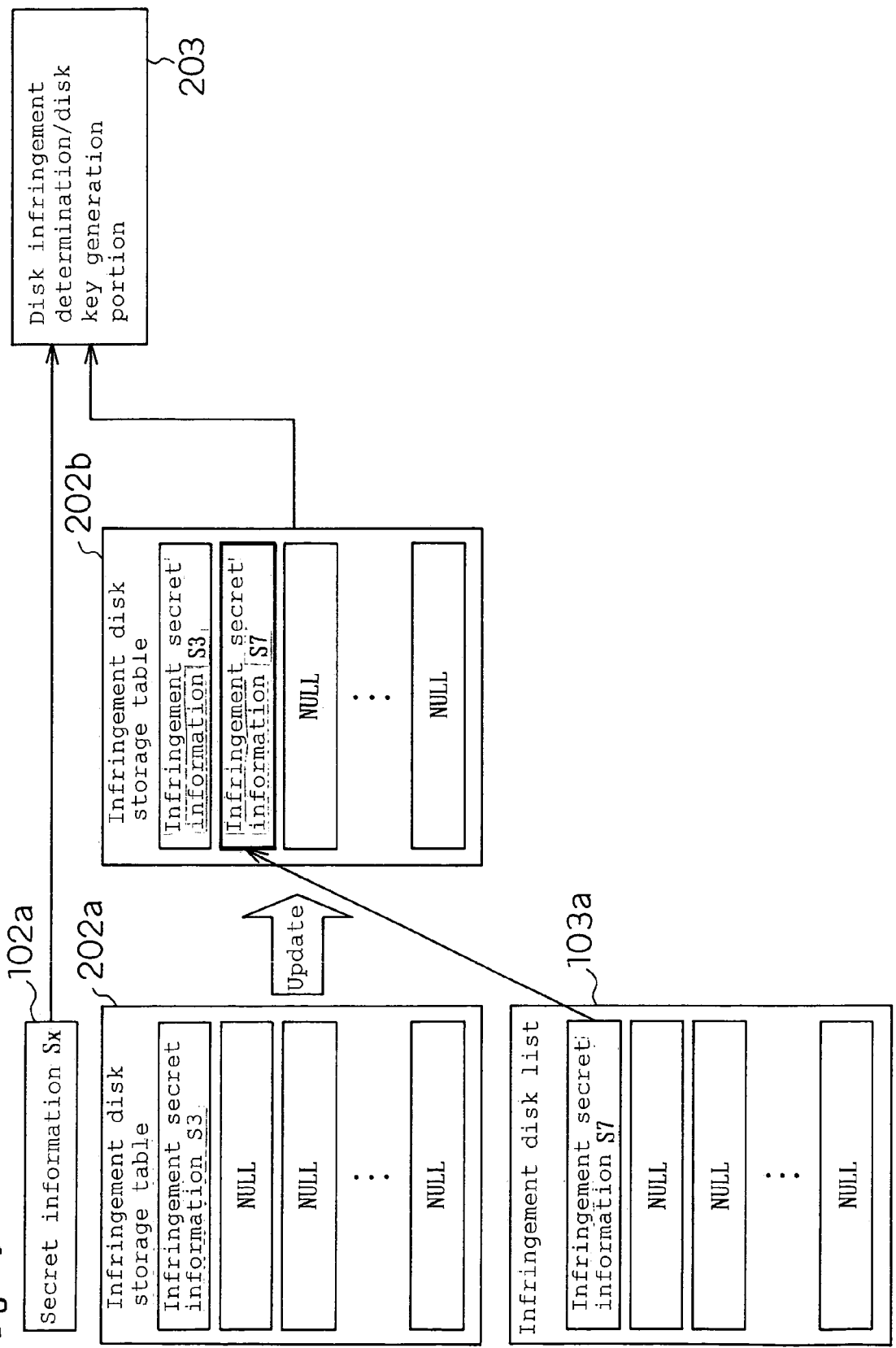
FIG. 3 is a diagram showing an update example of an infringement disk storage table according to the embodiment of the present invention.

In the example in FIG. 3, only the infringement disk information having secret information "S3" is recorded in an infringement disk storage table 202a until reproducing the optical disk 100 having the above described infringement disk list 103a. As the optical disk 100 is reproduced, the infringement disk storage table has "S7" written once thereto as with 202b, has the infringement disk added so that there are two infringement disks, and is sent to the disk infringement determination/disk key generation portion 203 to be compared to the secret information data 102a.

Furthermore, the infringement disk storage table 202 is constituted to connect the optical disk drive 200 to the Internet 216 so as to obtain current infringement disk information via the network connection portion 215.

Though it is not shown in FIG. 1, it is possible to exchange the infringement disk information between the optical disk 100 and the optical disk drive 200 by placing a copy of the infringement disk storage table 202 in the optical disk 100 as "the infringement disk list placed in a recording area" just like the first infringement drive list 108 described later.

Thus, it is possible, as to the optical disks once distributed in the market, to have the infringement information propagated more promptly, and so it becomes effective means of rapidly eliminating the pirated optical disks in the market.

The data on the infringement disk storage table 202 constituted as above is sent to the disk infringement determination/disk key generation portion 203. And the data is compared to the restored secret information 102a, and if something matching is discovered, the recording and reproduction operation of the optical disk drive 200 thereafter is prohibited by recording and reproduction prohibition means included in the disk infringement determination/disk key generation portion 203.

In the example in FIG. 3, when "Sx" is "S3" or "S7," the optical disk drive 200 prohibits the recording and reproduction as a license infringement disk.

This mechanism assumes the following situation. To be more specific, it assumes that a formatter apparatus provided to the licensee by the License administrative organization is stolen by an offender, and the pirated optical disk is created by embedding the secret information which can be generated by the formatter by means of conversion or abuse of the formatter.

It is also possible that an imprudent licensee analyzes the formatter and creates a pirated formatter which is unlicensed, and the pirated optical disk is thereby created. As that disk is the optical disk having correct secret information, even the legitimate optical disk drive cannot determine it as the pirated optical disk, and so it can be used just as the legitimate disk.

To prepare for such a state of affairs, it is designed so that, apart from the ID unique to the formatter, the number is automatically updated for each cutting in the secret information generated by the formatter apparatus.

In that case, it can be seen that the optical disks of the numbers after the formatter apparatus was stolen are infringements (infringement formatter IDs and infringement numbers).

It is unthinkable that, when illegitimately recording the secret information, the above described offender records the information leading to the determination that his or her disks are the infringement disks on the infringement disk list of those infringement disks.

However, it is possible, if there is the infringement disk storage table on the optical disk drive side, to determine the infringement disks by putting the secret information on the infringement disks on the infringement disk list of other legitimate disks and distributing them in the market.

To be more specific, the secret information on the infringement disks is stored on the optical disk drive having the legitimate disk mounted thereon.

For that reason, even if the infringement disk is mounted on the optical disk drive thereafter, the recording and reproduction can be prohibited because it can be determined as the infringement disk.

As the secret information 102 is important information in terms of license protection, it may undergo some kind of encrypting in advance in order to keep it confidential. In this case, a decryptor of the above described some kind of encrypting and a decrypting key for decrypting are included in the disk infringement determination/disk key generation portion 203.

In the case where an arbitrary value becomes an encrypting key, the license protection system of the optical disk will be collapsed just by having a recording method of the secret information exposed or hacked.

To solve it, the following method should be adopted. For instance, in the case where the key is 56 bits, the values of 56 bits are grouped into a plurality of groups which are then divided into infringement groups and legitimate groups.

The disk infringement determination/disk key generation portion 203 should have a filter of determining whether a code generated there belongs to the infringement group or the legitimate group.

56 bits is a decimal number of 17 digits which is a very large value compared to the number of times of actually feasible cutting, and so a ratio of the legitimate groups can be vary low.

Consequently, there is a high possibility that, even if the offender sets arbitrary secret information, it is caught as the infringement by the above described filter.

As a hack can be implemented only by a time-consuming and expensive round-robin tournament such as cutting and creating the optical disk and then checking whether or not it works normally, it is effective means of discouraging the offender from hacking.

Even if the key to the legitimate group is found, the key hacked by hard work can be easily nullified due to the distribution of the optical disk, wherein the distribution is caught by the License administrative organization and the value thereof is registered with the infringement disk list.

The disk infringement determination/disk key generation portion 203 generates a disk key 204 for the first time in the case where the secret information 102 of the optical disk 100 is not infringing on the license but is the legitimate information. The disk key 204 is sent to the secret data key generation portion 208 of generating a secret data key 209 of directly encrypting and decrypting the user data. The secret data key generation portion 208 encrypts a legitimately inputted data key 207 with the disk key 204 as the encrypting key so as to generate the secret data key 209.

The secret data key 209 may be any information generated by combining the data key 207 and the disk key 204.

For instance, the encrypting key may be the data key 207 and the encrypted data may be the disk key 204, or it may be addition or exclusive-OR of simple bit strings between the data key 207 and the disk key 204.

It is desirable, for the sake of enhancing security, to use an unconditional function such as a hash function wherein the data key 207 and the disk key 204 cannot be identified from the secret data key 209.

As above, encrypted recording and decrypted reproduction of the user data are possible in the case where the optical disk 100 is legitimate, but the recording and reproduction are prohibited in the case where the optical disk 100 is illegitimate (pirated version), so that the license of the optical disk is ordinarily protected.

As for the condition of normally performing the recording and reproduction on the legitimate optical disk, however, it is limited to the cases where the license protection system of the following optical disk drive normally works and the legitimate data key 207 is derived, that is, the recording and reproduction by the legitimate optical disk drive.

2. Regarding License Protection of the Optical Disk Drive:

Next, a description will be given as to the portion related to the optical disk drive of the license protection system of the present invention.

The optical disk drive 200 performs the following process in order to decrypt the legitimate data key 207.

First, it reads the encrypted data key list 104 by using control data reproduction means not shown, and inputs it to the license key infringement determination/data key decrypting portion 206.

The license key infringement determination/data key decrypting portion 206 selects one of the license keys stored in the license key storage portion 205 so as to check its number.

And if the number does not match with the infringement number sent from the infringement number updating portion 211, it takes the encrypted data key corresponding to the above described selected number out of the encrypted data key list 104 which has been sent, and decrypts the data key 207.

In the decrypting process of the data key 207, the above described license key becomes the decrypting key, and decrypts the encrypted data key in the encrypted data key list 104. In the case where there is the nullified key in the encrypted data key list 104, the number of the nullified key is rendered as the infringement number by the process in the second infringement drive list 210. This will be described later.

In the case where the selected number matches with the infringement number in the above step, the above described selected license key is nullified (infringement) so that another effective license key is sought. In the case where the license keys are left in the license key storage portion 205, the license keys which are left are selected in order, and the decrypting of the above described data key 207 is continued by the above described step.

Consequently, in the case where all the license keys are nullified, the recording and reproduction operation thereafter is prohibited by the recording and reproduction prohibition means included in the license key infringement determination/data key decrypting portion 206.

In the case where all the license keys are nullified, the optical disk drive 200 has only the infringement license keys, and so it is regarded as the optical disk drive infringing on the license and has the recording and reproduction prohibited.

A description will be given by referring to FIG. 4 next as to the function of rapidly distributing the information on the above infringement license keys to the optical disks already distributed in the market and quickly eliminating the pirated optical disk drives.

The second infringement drive list 210 is the list for the sake of extracting the infringement number which is the nullified key from the encrypted data key list 104 read from the optical disk 100 and holding it.

Figure 4:
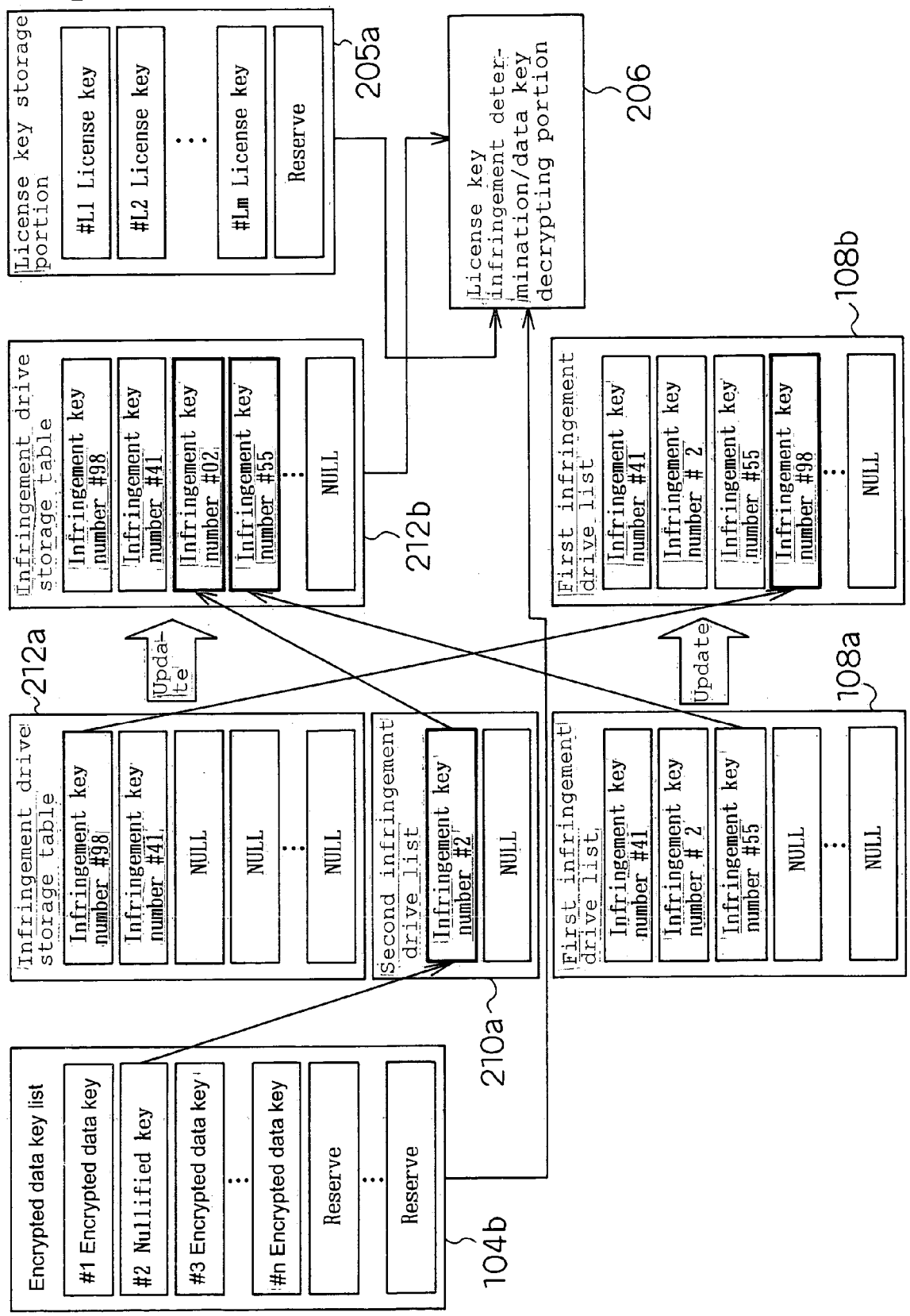
FIG. 4 is a diagram showing update examples of an infringement drive storage table, a second infringement drive list and a first infringement drive list according to the embodiment of the present invention.

In the example in FIG. 4, only the number 2 is registered as the nullified key with the encrypted data key list 104b (the same list as the one created in the example in FIG. 2), and the number 2 of the nullified key is extracted therefrom and held in the second infringement drive list as shown in 210a.

The first infringement drive list 108 placed in the recording and reproduction area on the optical disk 100 has the infringement number of the infringement license key recorded thereon by another optical disk drive having the optical disk 100 mounted thereon in advance (41, 2 and 55 are the infringement numbers on 108a in FIG. 4):

The infringement drive storage table 212 in the optical disk drive 200 has the infringement number of the infringement license key detected in the infringement number updating portion 211 before reproducing the optical disk 100 stored therein (98 and 41 are the infringement numbers on 212a in FIG. 4).

The infringement number updating portion 211 finds the infringement numbers existing on the second infringement drive list 210 but not existing on the infringement drive storage table 212 and the first infringement drive list 108, and registers them with the infringement drive storage table 212 and the first infringement drive list 108 respectively.

In the example in FIG. 4, 108a already has the infringement number 2 registered therewith, and so no addition is made. However, the infringement number 2 is not registered with 212a, and so the infringement number 2 is additionally registered with the infringement drive storage table as shown in 212b.

The infringement number updating portion 211 also finds the infringement numbers not existing on the infringement drive storage table 212 and the first infringement drive list 108 respectively, and mutually registers them with the infringement drive storage table 212 and the first infringement drive list 108.

In the example in FIG. 4, the infringement number 98 existing only in 212a is additionally registered with 108b, and the infringement number 55 existing only in 108a is additionally registered with 212b.

Consequently, the description contents of the infringement drive storage table 212 and the first infringement drive list 108 become the same, and are updated to the infringement numbers of the infringement license keys identifiable at the point in time.

This is sent to the license key infringement determination/data key decrypting portion 206, and is compared to the key numbers (L1 to Lm in this case) stored in the license key storage portion shown by 205a in FIG. 4 so as to decrypt the data keys by using the license keys not matching with the infringement numbers as the decrypting keys.

Furthermore, it is possible, for the sake of propagating the infringement drive information faster, to implement more effective license protection of the drive, if the optical disk drive 200 takes in the infringement information issued by the License administrative organization from the Internet 216 via the network connection portion 215 and allows the infringement drive storage table 212 to be updated to the current infringement information. In this case, it is more effective to have the first infringement drive list 108 rendered as the same value as the infringement drive storage table 212 by the infringement number updating portion 211.

As described earlier, the secret data key 209 generated from the legitimate disk key 204 and legitimate data key 207 in the secret data key generation portion 208 is sent to the user data decryptor 213 and the user data encryptor 214 respectively so as to become the respective decrypting key and encrypting key.

To be more specific, the secret data key 209 in the encrypting and decrypting processes here function as common key in the common key system. The user data decryptor 213 decrypts the reproduction-only encrypted data 106 or the recorded encrypted data 107, and outputs it as the output user data 217 to the outside of the optical disk drive 200 (a PC for instance).

The input user data 218 is encrypted by the user data encryptor 214, and is recorded as the encrypted data 107 on the optical disk 100.

As described above, the optical disk drive 200 legitimately receives the license key information from the License administrative organization. And it is rendered as a black box because disclosure is limited as to the information on a series of processes up to the decrypting of the data key 207. For that reason, the legitimate data key 207 cannot be obtained unless that information is provided from the License administrative organization, and consequently the secret data key 209 of encrypting and decrypting the user data cannot be obtained.

To be more specific, the pirated optical disk drive incapable of handling the legitimate encrypted and decrypted user data determined by the License administrative organization cannot normally reproduce the reproduction-only encrypted data 106 or the recorded encrypted data 107 recorded on the licensed and legitimate optical disk.

Furthermore, it cannot rewrite the encrypted data 107 because it cannot normally read file management data recorded in the encrypted data. As a matter of course, in case it can record the user data, it can only record the user data which is not encrypted. And as the legitimate optical disk drive decrypts it, the user data will not be reproduced as normal data.

Thus, only the legitimate optical disk drive can normally record and reproduce only the legitimate optical disk so as to eliminate the pirated optical disks and pirated optical disk drives and protect the license of the optical disk drives.

The above described the case of encrypting the entire user data. However, the optical disk according to the present invention and the optical disk drives related to the present invention are not limited thereto, but may have a configuration wherein a part of the user data is recorded without encrypting (that is, in plain text) based on the predetermined rule as previously described in order to reduce a burden of encrypting and decrypting processes. It may also have the configuration wherein management data invisible to the user such as alternation process is recorded as-is in plain text. However, a selection of recording all the files without encrypting becomes possible, if it has the configuration wherein the user can select simply recording and reproducing the data in the units of files without encrypting. Consequently, there is a possibility that a so-called security hole in which any disk is used in a state of no encrypting may be created and the license protection function may be impaired. Therefore, it is desirable, in the case of recording a part of it in plain text as described above, to have the configuration wherein the encrypting and decrypting processes are indispensable to the recording and reproduction of the user data, such as encrypting a part of sectors without fail.

In short, the optical disk according to the present invention is the optical disk (optical disk 100 for instance) having first information (secret information 102 for instance) on unique information given to a specific optical disk manufacturer or a specific optical disk and second information (information recorded on the infringement disk list 103 for instance) of identifying the illegitimate optical disk manufacturer or illegitimate optical disk recorded thereon in advance. It may be the optical disk of any configuration on condition that it has the area in which the encrypted data encrypted based on the above described first and second information (record area of the reproduction-only encrypted data 106 for instance) or the area capable of recording the data to be encrypted based on the above described first and second information (record area of the encrypted data 107 for instance).

The above optical disk drive may be the optical disk drive of any configuration on condition that it has first information deciphering means (secret information demodulator 201 for instance) of deciphering the first information (secret information 102 for instance) on the unique information given to the specific optical disk manufacturer or specific optical disk recorded on the optical disk (the optical disk 100 in FIG. 1 for instance), second information storage means (infringement disk storage table 202 for instance) of identifying the illegitimate optical disk manufacturer or illegitimate optical disk (information recorded on the infringement disk list 103 for instance), first determination means (disk infringement determination/disk key generation portion 203 for instance) of determining whether or not the above described optical disk is illegitimate based on deciphering results of the above described first information deciphering means and storage contents of the above described second information storage means, and controlling means (secret data key generation portion 208, user data decryptor 213 or user data encryptor 214 for instance) of controlling reproduction of the data from the above described optical disk and/or recording of the data on the above described optical disk based on determination results of the above described determination means.

3. Regarding the License Administrative Organization:

Next, the functions of the above described License administrative organization will be described by using FIG. 5.

Figure 5:
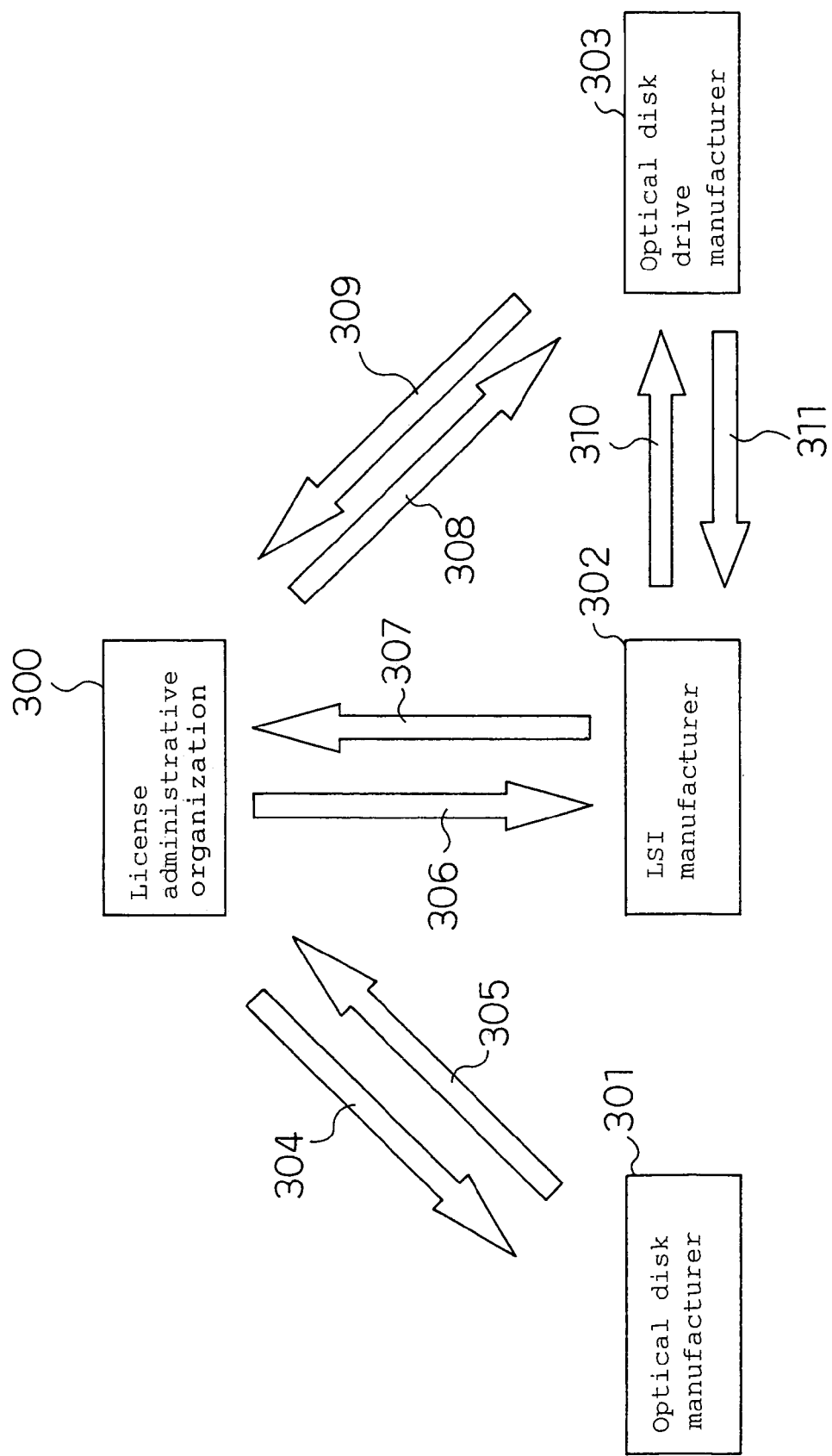
FIG. 5 is a relationship diagram showing a relationship between a license administrative organization and optical

In FIG. 5, reference numeral 300 denotes the License administrative organization founded at least by involving the licensor, and it manages the information on the license of the optical disk system and the information on the license protection system and provides the information to the licensee. Irrespective of whether the licensor is comprised of a single company or a plurality of companies, the License administrative organization 300 may be the single company itself constituting the licensor or its subsidiary or a company other than those constituting the licensor.

Reference numeral 301 denotes the optical disk manufacturer, 302 denotes the LSI manufacturer, and 303 denotes the optical disk drive manufacturer, and all of them are the licensees being licensed by the License administrative organization 300. Hereafter, the former may be referred to as a medium licensee, and the latter two as drive licensees for description purposes.

The arrow indicated by reference numeral 304 through 311 denotes an administrative mechanism determined by the licensor for the sake of protecting the license.

Hereafter, the administrative mechanism will be concretely described by taking examples. It is clearly stated in advance that the license protection is not achieved only by these examples but is implemented for the first time by secretly rendering it complicated and hard to notice and providing a number of barriers, and so a setup of the mechanism not deviating from the gist thereof will suit the object of the present invention.

Hereafter, as to the arrows numbered in FIG. 5, the embodiments thereof will be described by itemizing them.

(Arrow 304): The License administrative organization 300 supplies to the optical disk manufacturer 301 the formatter used for cutting the stamper of the above described optical disk 100. The inside of the above described formatter has a tamper-resistant structure which is unanalyzable, and has the configuration wherein the information on license administration is basically kept confidential to the optical disk manufacturer 301 so that it is protected from an unexpected hack of the licensor. Furthermore, every time the optical disk manufacturer 301 cuts the stamper, at least the secret information 102, infringement disk list 103 and encrypted data key list 104 are sent from the License administrative organization 300 via the network in order to counter theft of the above described formatter and a counterfeit of the formatter by means of an advanced hack technology.

When sending them, certification separately established for the sake of minimizing damage of eavesdropping, theft and so on is implemented between the above described formatter and a server installed on the License administrative organization 300. To enhance security of the certification, it is desirable to use a certificate of a public-key system.

It is desirable for management purposes that the above described formatter has the configuration wherein necessary information disappears if the cutting is finished and supply of the necessary information from the License administrative organization 300 is rendered indispensable.

While the network speed is as slow as it is now, the encrypting of the reproduction-only encrypted data 106 is locally performed inside the above described formatter.

It should be constituted so that, if the optical disk manufacturer 301 has the user data not encrypted stored in the above described formatter, the secret data key 209 is generated based on the secret information 102 and the data key 207 inside the formatter so as to perform the encrypting process.

In the case of sending the user data (in plain text or separately encrypted) and returning it after encrypting it via the network, it is decided that, as it is dangerous security-wise, the information is exchanged by using a protocol having both the certification and confidentiality by combining a general public key cryptosystem with the common key system so that the information will be protected.

It should have the configuration wherein, as to the control data, the data to be set up by the optical disk manufacturer 301 and the data sent by the License administrative organization 300 are synthesized inside the formatter.

(Arrow 305): Based on contract conditions with the licensor, the optical disk manufacturer 301 pays to the License administrative organization 300 an initial or periodical license contract rate, a rental expense for the above described formatter, a license fee per stamper created, a logo license and/or license fee for the number of optical disks sold and so on. In addition to reports on the above contents, there are the reports made for the sake of avoiding payments accruing to the licensee in spite of no product manufactured due to defective test cuttings and stampers and the reports made as to a management condition of the above described formatter for the license protection.

(Arrow 306): The license-contracted LSI manufacturer 302 will have the information on the license protection system in the optical disk drive 200, in a form of limited disclosure or similar to a black box, provided from the License administrative organization 300.

Basically, it is secure to have all the means related to the license protection contained in one LSI. In particular, it is even more secure if it is an LSI of the tamper-resistant structure of which inner pattern is destroyed when trying to open an LSI package for analysis purposes. It is further secure in the case of using a method of purposely complicating a pattern inside the LSI or purposely mixing a meaningless pattern.

However, the license keys need to be stored for each LSI, and the process of mixing a nondestructive memory device such as a flash ROM, an EEPROM or a one-time ROM is required only for that purpose. And so it is also thinkable that the license keys are not contained in the LSI in the case where the price significantly increases.

In that case, the license keys are placed on an external memory, which may be the security hole such as being directly visible from above a bus when inputting to the LSI. Therefore, it is required to place the license keys encrypted by a separately established method as "external license keys" outside and decrypt them inside the LSI so as to enhance strength from the hack.

This method is called an "external license key cryptosystem" for the sake of subsequent description. This method is basically determined by the License administrative organization 300. It is a secure method of providing the encrypting keys and decrypting algorithms of the external license keys by rendering them as the black box (a net list of limited disclosure). To prevent the hack, the external license keys are modified by the LSI manufacturer or an LSI mask so that encrypted license keys are usable only for a specific LSI even if stolen.

It is designed so that the aforementioned nondestructive memory devices are mounted inside the LSI, and a part of the encrypting keys and encrypting algorithms are related to their memory cells. As for access to the above described memory devices from the outside, the above described tamper-resistant effect can be dramatically improved by providing the functions of collective or block erasure and writing so that the memory contents can be referred to only by an inner encrypting algorithm and so on. Accordingly, in the case where the security is especially required, such a configuration is adopted.

(Arrow 307): Based on the contract conditions with the licensor, the LSI manufacturer 302 pays to the License administrative organization 300 the initial or periodical license contract rate, license fee per LSI mask created, logo license and/or license fee for the number of LSIs sold and so on.

The number of the LSI manufacturers 302 is generally smaller than the number of the optical disk drive manufacturers 303, and they are in a position to easily grasp the number of LSIs sold. Therefore, the licensor can reduce possibility of losing collection opportunities by founding and adopting a "surrogate payment system" in which the LSI manufacturer 302 collects the license fee per drive to be paid by the optical disk drive manufacturer 303 (excluding defects due to yields) on behalf of the License administrative organization 300 and pays it to the License administrative organization 300 (the following description also shows a flow in the case of adopting the surrogate payment system).

As a matter of course, it is necessary to adjust a time difference between sales and payment so as to be mutually satisfactory and comply with the law. The LSI manufacturer 302 reports the produced and sold LSI quantities from the viewpoints of the license protection and proper collection of license fees.

In the case of the external license key cryptosystem incapable of containing the license key in the LSI, the license key is distributed only to the optical disk drive manufacturer 303. Only the license key for testing is provided to the LSI manufacturer 302 so that the combination of the LSI and license key from the LSI manufacturer will not be stolen, and the strength of the license protection will thereby increase.

In the case of containing the license key in the LSI, the license key is not provided to the optical disk drive manufacturer 303. In this case, the LSI manufacturer 302 is required to perform thorough management so that the LSI does not go anywhere other than the licensee, and needs to perform such management.

As for the license key, it is effective to implement a mechanism in the above described license key infringement determination/data key decrypting portion 206, the mechanism capable of secretly embedding ID information of a party to whom it is provided, and in case the license key is exposed by malice or neglect on that party and illegitimately diverted, collectively nullifying a key group corresponding to the ID so as to disclose this to the other party and request reinforced management regarding the license.

For this purpose, it is sufficient to add a filter function of eliminating all the groups of the license keys belonging to the infringement ID in the license key infringement determination/data key decrypting portion 206 by using the information on a part of the license key as the ID information, adding an infringement ID to the above described encrypted data key list 104 and adding the data structure and procedure reflected on the first infringement drive list 108 and the infringement drive storage table 212.

(Arrow 308): The optical disk drive manufacturer 303 is provided with general license-related information on the optical disk system in a form basically prohibiting disclosure to a third party based on a license contract.

In the case where external storage of the license key is necessary, the License administrative organization 300 encrypts the license key to be distributed by the external license key cryptosystem and delivers the number thereof equal to necessary manufactured quantity to the optical disk drive manufacturer 303. The license key is restored by inputting it to the LSI manufactured by the licensed LSI manufacturer 302 according to a predetermined rule so as to function as a normal optical disk drive.

(Arrow 309): The optical disk drive manufacturer pays to the License administrative organization 300 the initial or periodical license contract rate, an issuance fee of the license key and so on based on the contract conditions with the licensor. In the case of the above described surrogate payment system, the license fee is paid by way of the licensed LSI manufacturer 302. This will be described later.

In addition, a report on the production and sales quantities of the optical disk drive is made from the viewpoint of the license protection and proper collection of license fees.

(Arrow 310): The LSI manufacturer 302 sells the LSI on which the license protection function according to the present invention is implemented only to the optical disk drive manufacturer 303 certified to be the licensee. That certificate is issued from the License administrative organization 300 on a route of the arrow 308. The licensed LSI manufacturer 302 needs to check it on sales.

In the case where the LSI of a type externally affixing the license key is used, the License administrative organization 300 provides the optical disk drive manufacturer 303 with the license key encrypted by the external license key cryptosystem according to the ID and mask of the licensed LSI manufacturer 302.

For that reason, the optical disk drive manufacturer 303 cannot produce the normal optical disk drive without purchasing the LSI of the applicable LSI manufacturer 302. The LSI manufacturer 302 sells the quantity of the LSI ordered by the optical disk drive manufacturer 303 as the licensee. In the case of the above described surrogate payment system, however, it requests the optical disk drive manufacturer 303 to pay the license fee according to the quantity. In this case, a sales price of the LSI and the license fee should be clearly distinguished in handling.

(Arrow 311): As previously mentioned, the optical disk drive manufacturer 303 places an order with the licensed LSI manufacturer 302 for the necessary quantity. At the same time, in the case of the above described surrogate payment system, it pays the license fee at the point in time when the optical disk drive using the LSI is actually manufactured and either shipped or sold (according to the license contract).

Results of performing the license fee payment are notified to the License administrative organization 300 so that the License administrative organization 300 can collect the license fee without delay. As previously mentioned, it is not necessary to handle the price for the LSI and the license fee on the same conditions.

It is also possible, depending on the license contract, to provide the license key to the licensed LSI manufacturer 302 or provide the encrypted license key to the optical disk drive manufacturer 303 only on the payment of the license fee.

As described above, for the sake of the license protection of the optical disk and/or optical disk drive, a management setup such as the License administrative organization shown in FIG. 5 is necessary in addition to a technical mechanism described in FIG. 1.

The points of the management setup of the License administrative organization are the following four points.

(1) The License administrative organization manages a part or all of the secret information unique to the license such as technical information and the encrypting keys related to the license, and provides that information only to the above described medium licensee and/or drive licensee in the form of limited disclosure or similar to a black box.

(2) It is a setup wherein the licensee has confidentiality obligation as to the secret information, and in the case of failing to fulfill the license conditions such as the confidentiality obligation, the optical disk or optical disk drive of the failing licensee no longer functions on the optical disk system.

(3) The License administrative organization finds out the infringement optical disks and infringement optical disk drives based on market monitoring, licensee reports and so on so as to nullify them.

(4) It is a setup wherein the license fees are paid to the License administrative organization adequately and on a timely basis.

Various arrangements and combinations thereof, not limited to the examples of this embodiment, do not deviate from the gist of the present invention as long as they are in compliance with these objects.

It goes without saying that the management setup such as the license conditions and limited disclosure of the information should not give conspicuous disadvantage or inconvenience to the licensee and user, and should be considered and introduced to be implemented within the scope of the law and to the extent of not deviating from conventional wisdom.

4. Regarding the Scope Disclosed in the Embodiment:

The present invention is not limited to the scope described in the above embodiment.

To be more specific, (1) In the embodiment, the license protection of both the optical disk and optical disk drive can be simultaneously implemented. It goes without saying, however, that the license protection of the optical disk or optical disk drive can be singly implemented.

First, in the case of protecting only the license of the optical disk, the functions up to decrypting of the above described data key 207 should be omitted. In this case, the secret data key generation portion 208 only functions with the disk key 204 so as to generate the secret data key 209.

Protecting only the license of the optical disk is on the assumption that the optical disk drive cannot be easily manufactured without the information and know-how provided by the licensor or special manufacturing equipment and a protected key device, and that the pirated optical disk drive cannot be created even if the license protection technology is not daringly introduced to the optical disk drive.

Therefore, even if the pirated optical disk appears, that pirated optical disk cannot be used because there are only the legitimate optical disk drives.

In the case of protecting only the license of the optical disk drive, the functions up to generating the disk key 204 should be omitted. In this case, it is on the assumption that, even without the protection technology such as embedding of the secret information 102, technological barriers of the optical disk manufacturing are too high to create a pirated version, although the details are omitted because the above description can be applied by reversing the optical disk and the optical disk drive therein.

(2) The embodiment assumed the optical disk as a partial ROM of a rewritable type or of a type having the rewritable and reproduction-only types mixed. However, the similar license protection can be applied to the recording and reproduction area of the partial ROM of a write-once type, a reproduction-only type or a type having a write-once type recording area.

In the case of the reproduction-only type, however, the present invention has an advantage that the optical disk can be used substantially in common irrespective of the recording and reproduction type thereof except that the first infringement drive list 108 set up in the recording and reproduction area cannot be used.

(3) The embodiment makes full use of the functions in FIG. 1 in order to reinforce the license protection of the optical disk and optical disk drive. To reduce apparatus costs, however, there is also a thinkable embodiment wherein, while preserving the basic functions of the license protection, all or a part of the infringement disk storage table 202, infringement drive storage table 212 and network connection portion 215 is not implemented. Likewise, the combination of implementation can be determined for each optical disk system by the License administrative organization as a tradeoff with the strength of the license protection.

(4) The embodiment makes full use of the functions in FIG. 1 in order to reinforce the license protection of the optical disk and optical disk drive. To further reinforce it, for instance, the data key is associated with generation of the secret information 102. To be more precise, they are associated by rendering seeds of generation of random numbers required to generate the secret information 102 as all or a part of the data key.

If thus arranged, the secret information 102 cannot be demodulated unless the data key is given to the infringement disk storage table 202 to generate the same random numbers. To be more specific, the license protection is reinforced so that even an attempt of demodulation of the secret information 102 cannot be made unless it is the legitimate drive.

(5) According to the embodiment, the user data is encrypted and recorded for the license protection of the optical disk and optical disk drive. However, it is also possible, instead of the encrypting, to use an interleave function or a scramble function generally defined in an optical disk format and implemented on the apparatus.

To be more specific, it is possible, even though not as much as the case of using the encrypting, to implement reasonable security by changing the method of interleave on recording and deinterleave on reproduction in the order based on a specific rule corresponding to the above described secret data key 209 or changing the contents of a scramble on recording and a descramble on reproduction by the seeds determined based on a specific rule corresponding to the secret data key 209 likewise.

Furthermore, it is possible, by these combinations including the encrypting, to realize stronger license protection without extra costs.

(6) The embodiment has the setup wherein the infringement disk list 103 and first infringement drive list 108 are recorded in the infringement disk storage table 202 and infringement drive storage table 212 respectively, and the infringement information from the Internet 216 is also recorded in both these storage tables so as to rapidly eliminate the optical disks and optical disk drives infringing on the license. To prepare for the cases where, for the purpose of cracking to destroy the license protection system, an especially malicious license infringer falsifies the information from the infringement disk list 103 and first infringement drive list 108 and the information from the Internet 216 to purposely render all or almost all of the normal optical disks and optical disk drives infringing, it is appropriate, if the number of new infringements exceeds the number of the infringement optical disks and optical disk drives registered in the storage tables, to regard that infringement information as illegitimate, and so a measure such as prohibiting that infringement determination should be taken.

It is also desirable, as to communication on the Internet, to enhance resistance to falsification by performing the certification such as exchanging appropriate certificates.

5. Regarding the Recording and Reproduction Method of the Secret Information:

Hereafter, as to the secret information 102 shown in the embodiment, a detailed description will be given about the embodiment of its recording method and its recording and reproduction method by using FIGS. 6 to 14.

Figure 6:
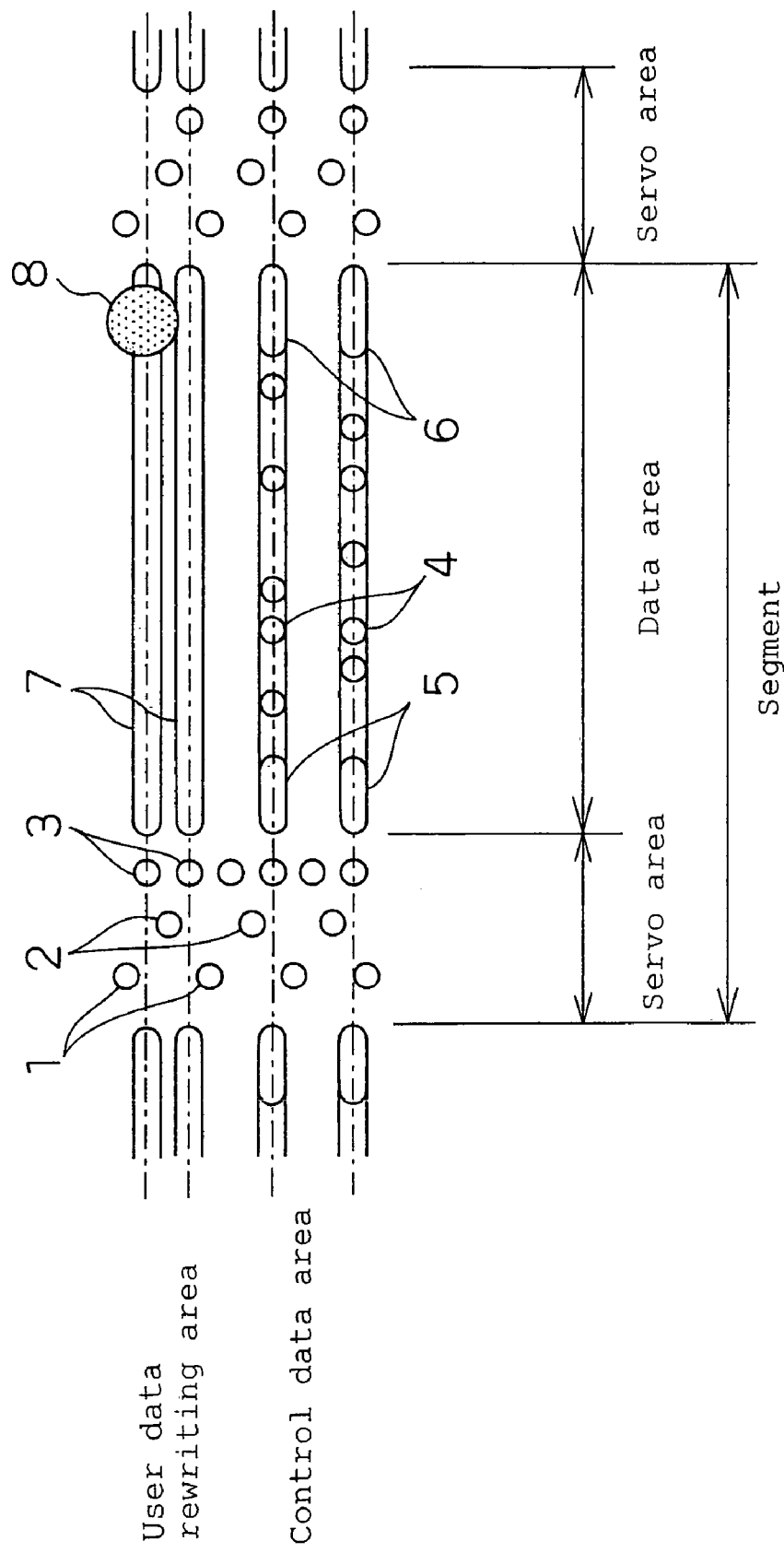
FIG. 6 is a structure diagram of the optical disk according to the embodiment of the present invention.

FIG. 6 is an example of the pre-pit and groove shape of the rewritable type optical disk 100, and the optical disk of performing tracking by a sample servo in a rewriting area is shown here. FIG. 6 is a drawing showing an expanded view of a track of the optical disk 100, where a user data rewriting area is shown in the upper part of the drawing and a segment structure of a control data area is shown in the lower part thereof. The track is comprised of a plurality of segments. One segment is comprised of a servo area and a data area. The servo area is comprised of a first wobble pit 1 and a second wobble. pit 2 for a sample servo and an address pit 3. A recording and reproduction light beam 8 is tracked so that addition signals of reflected light from the first wobble pit 1 and second wobble pit 2 become equal. Reference numeral 7 denotes a groove provided in the data area of the user data rewriting area, and the recording and reproduction light beam 8 is tracked and scanned at the center thereof.

The data area in the control data area is comprised of an emboss data pit 4, a head unique length mark 5 and an end unique length mark 6. The emboss data pit 4 shows the control data, which is recorded by pre-pit position modulation here. The head unique length mark 5 and end unique length mark 6 are used in order to identify the servo area and data area. The recording and reproduction light beam 8 scans the emboss data pit 4 shown by a dashed line in FIG. 6 to read the control data.

The secret information 102 can be recorded by minutely displacing the first wobble pit 1, second wobble pit 2, address pit 3, emboss data pit 4, head unique length mark 5, end unique length mark 6 and a groove 7 in FIG. 6.

All of them are embosses created by cutting the optical disk 100, and are formed as concavities and convexities as a substrate before forming a recording film. As a precondition, the above described minute displacement is held down to a level of not blocking the functions which the embosses originally have. Therefore, it becomes the optical disk incapable of reading the secret information 102 even if the aforementioned "RF copy duplication" and "copy stamper duplication" are performed so that it can be determined as the pirated optical disk.

As previously mentioned, the secret information 102 has an advantage that, as it does not depend on the recording film, the secret information can be handled in common even in the case where the optical disk system handles the reproduction-only type, write-once type, rewritable type or various optical disks having combined them. As a matter of course, it is possible, in the case of the write-once type and rewritable type, to further record the secret information by means of the minute displacement of recording marks.

FIGS. 7 to 10 are the drawings explaining methods of physically recording the secret information 102 on the optical disk as a "concrete example of minute displacement (1)" to a "concrete example of minute displacement (4)."

Figure 7:
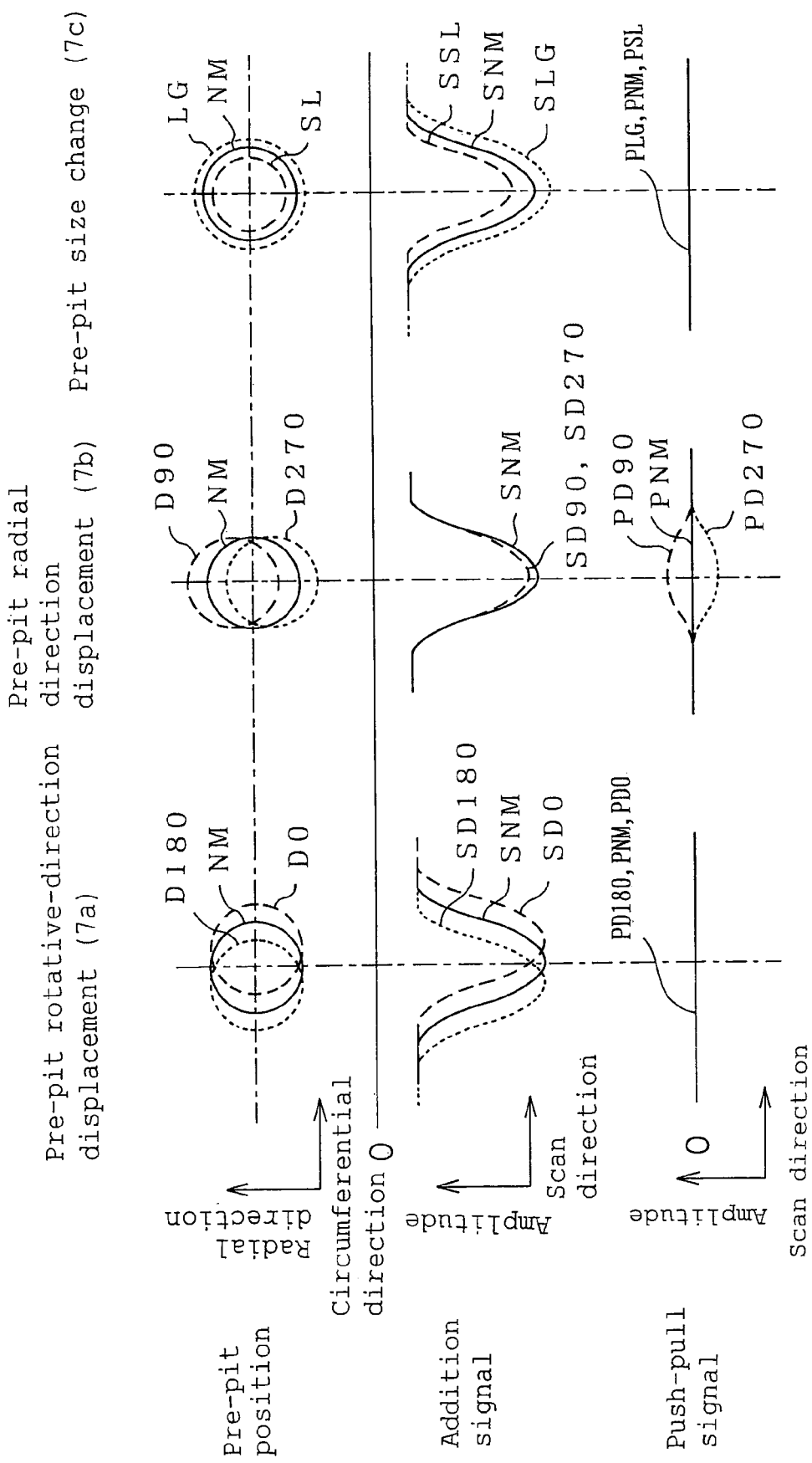
FIG. 7 is a diagram showing a concrete example (1) of minute displacements according to the embodiment of the present invention.

FIG. 7 shows the displacement of the pre-pit in a rotative direction of the disk (tangential direction) (reference numeral 7*a* is given in FIG. 7), displacement of the pre-pit in a disk-radius direction (radial direction) (7*b*) and change in the pre-pit size (7*c*).

They indicate the pre-pit positions, addition signals and push-pull signals from the top respectively. Their respective horizontal and vertical axes are circumferential/radial, scanning direction/amplitude and scanning direction/amplitude. NM at the pre-pit position indicates a normal position at which each pre-pit should originally be.

In a pre-pit rotative direction displacement (7*a*) the position having moved rightward from the normal position NM of the pre-pit is D0. A value following a symbol D denotes an angle when seeing the center of the pre-pit minutely displaced from the center of the pre-pit at the normal position NM.

Therefore, the pre-pit shifted to the left in (7*a*) is D180. As D0 and D180 are displaced, the addition signals change as with SD0 and SD180 against a signal SNM of the normal pre-pit as if having the signals shifted in a time-base direction respectively. However, the push-pull signals remain 0 and unchanged as PD0 and PD180 against a signal PNM of the normal pre-pit respectively.

In a pre-pit radial direction displacement (7*b*), as D90 and D270 are displaced, the addition signals only have a signal amplitude reduced a little against the signal SNM of the normal pre-pit without having the signals shifted in the time-base direction as with SD90 and SD270 respectively.

However, the push-pull signals change against the signal PNM of the normal pre-pit as with PD90 and PD270 in proportion to the displacement in the radial direction respectively.

Thus, in the case where the pre-pit is minutely shifted in the radial direction and is detected by the push-pull signals, the aforementioned "RF copy duplication" cannot reflect the information on the secret information 102 on the RF signals, and so it cannot create the pirated version. Therefore, it is an effective method of recording the secret information.

In FIG. 7, as a method of representing the change in the pre-pit size (7*c*), the cases of rendering the pre-pit size larger and smaller in reference to the normal pre-pit size NM are indicated as LG and SL respectively. As the sizes of LG and SL are displaced, the addition signals change peak signal amplitudes to be larger and smaller respectively without having the signals shifted in the time-base direction against the signal SNM of the normal pre-pit as with SLG and SSL respectively, and the push-pull signals remain 0 and unchanged as PLG and PSL against the signal PNM of the normal pre-pit respectively.

To implement the cutting in this case, the pre-pit size should be changed by modulating the strength of recording power or changing exposure length of the pre-pit.

In the case of considering the pre-pit as being isolated as in FIG. 7, there is no substantial change, but the pre-pit is continuously recorded based on the specific rule in actual information recording, and so appropriate size modulation should be performed in consideration of recording density, light beam resolution and so on.

Figure 8:
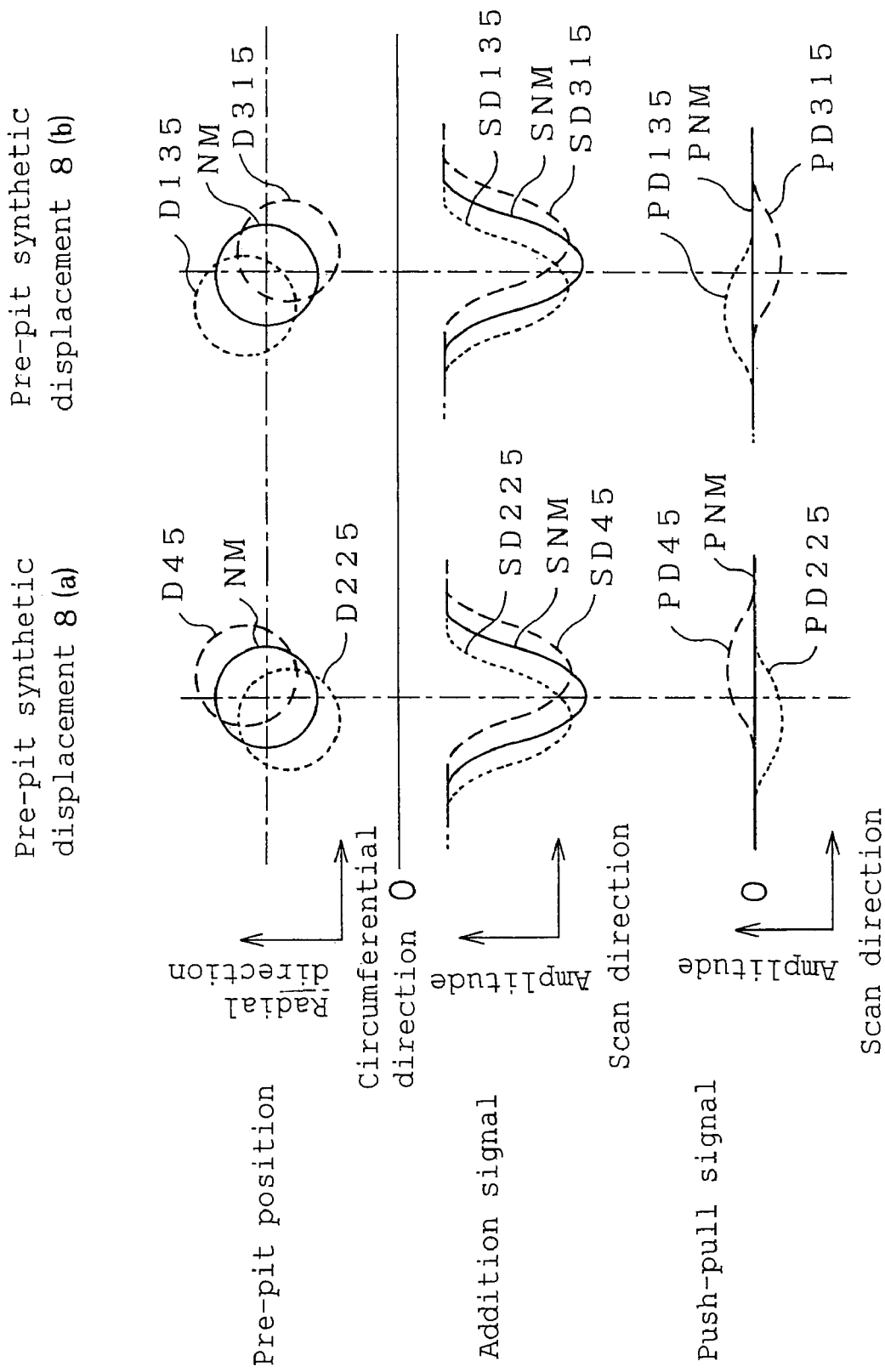
FIG. 8 is a diagram showing a concrete example (2) of the minute displacements according to the embodiment of the present invention.

FIG. 8 shows a synthetic displacement combining the displacement of the pre-pit in a rotative direction of the disk and displacement in the disk-radius direction in FIG. 7, where the display method is the same as FIG. 7.

In the synthetic displacement of the pre-pit (reference numeral 8*a* is given in FIG. 8), the displacement directions of the pre-pit along a straight line of a positive inclination 1 are indicated by giving reference numerals D45 and D225. In the synthetic displacement of the pre-pit (8*b*), the displacement directions of the pre-pit along a straight line of a negative inclination 1 are indicated by giving reference numerals D135 and D315. Here, symbol NM is given to the normal pre-pit position.

The addition signals are shifted in the time-base direction as with SD45, SD225, SD135 and SD315 and have the amplitude reduced a little against the signal SNM of the normal pre-pit respectively.

The push-pull signals change against the signal PNM of the normal pre-pit as with PD45, PD225, PD135 and PD315 in proportion to the displacement in the radial direction and are shifted in the time-base direction respectively. Therefore, it is possible, by using the pre-pit displacement of the synthetic displacement, to detect four types of displacement statuses by combining the addition signals and the push-pull signals.

It is also possible to extract four types of displacement just from the push-pull signals due to deviations in phases of signal polarities.

In FIGS. 7 and 8, it is intuitively thinkable to increase the amount of information by rendering displacement angles smaller. However, the minute displacements are of a level low enough to exert no influence over the normal pre-pit, and a predetermined number of them are embedded according to a predetermined rule so as to record the information equivalent to 1 bit of the secret information 102. Therefore, it may not be so practical to further classify them.

Figure 9:
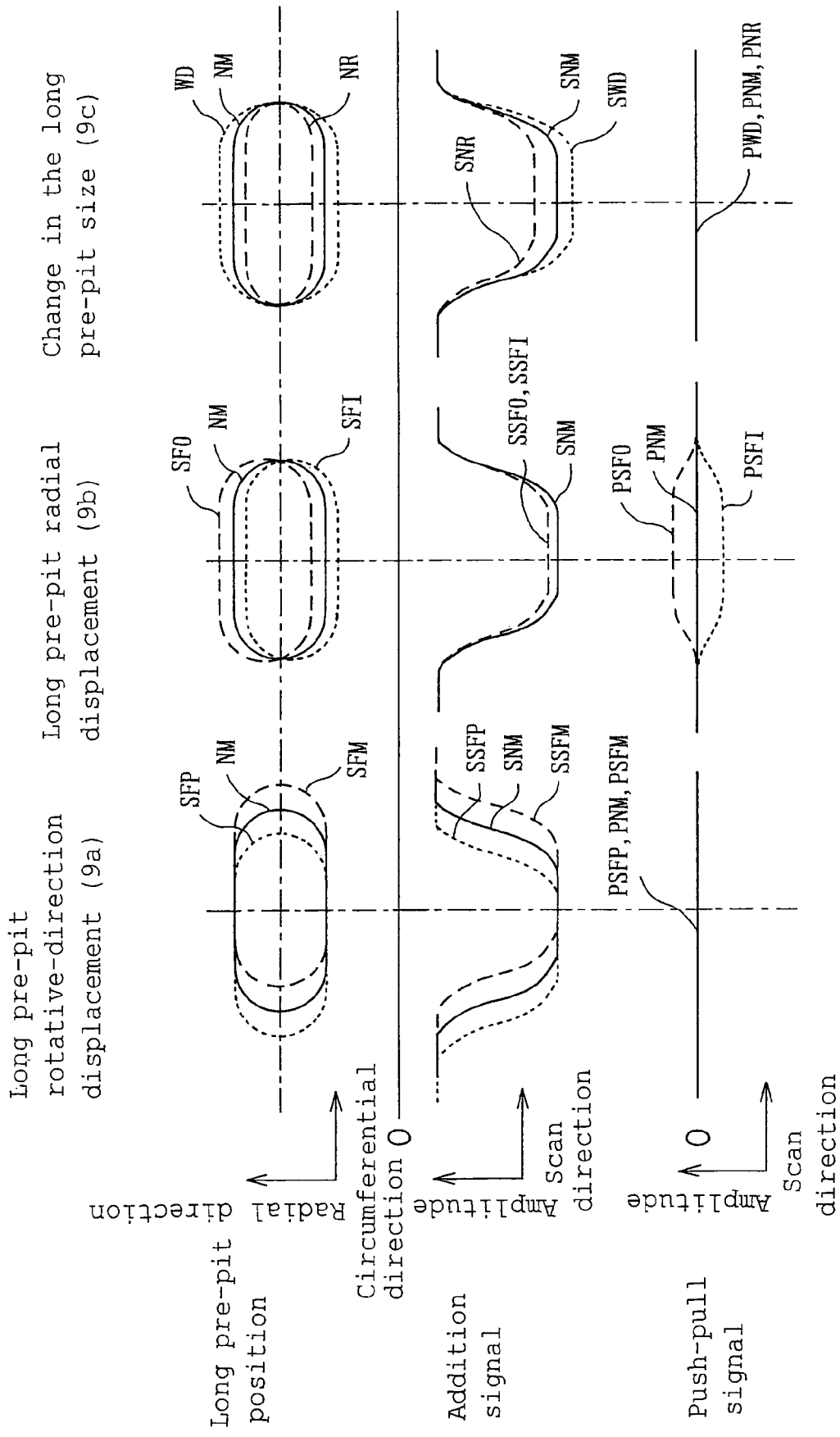
FIG. 9 is a diagram showing a concrete example (3) of the minute displacements according to the embodiment of the present invention.

FIG. 9 is an example of performing the minute displacements in the case where the pre-pit is not short and circular as in FIGS. 7 and 8 but long as when modulating a pulse width. FIG. 9 shows the displacement of a long pre-pit in the rotative direction of the disk (reference numeral 9*a* is given in FIG. 9), displacement of the long pre-pit in the disk-radius direction (9*b*) and change in the long pre-pit size (9*c*). They indicate the long pre-pit positions, addition signals and push-pull signals from the top respectively. Their respective horizontal and vertical axes are circumferential/radial, scanning direction/amplitude and scanning direction/amplitude. NM at the pre-pit position indicates a normal position at which each long pre-pit should originally be.

In the long pre-pit rotative direction displacement (9*a*), the positions having shifted leftward and rightward from the normal position NM of the long pre-pit are represented as SFP and SFM respectively. The addition signals shift in the time-base direction against the signal SNM of the normal length pre-pit as with SSFP and SSFM respectively, but the push-pull signals remain 0 and unchanged as PSFP and PSFM against the signal PNM of the normal length pre-pit respectively.

In the long pre-pit radius direction displacement (9b), upward (assuming a circumference) and downward (assuming an inner radius) deflections are SFO and SFI respectively. The addition signals only have the signal amplitude reduced a little against the signal SNM of the normal pre-pit without having the signals shifted in the time-base direction as with SSFO and SSFI respectively. However, the push-pull signals change against the signal PNM of the normal length pre-pit as with PSFO and PSFI in proportion to the displacement in the radial direction respectively. In this case, the "RF copy duplication" is not performed as previously mentioned.

In the change in the long pre-pit size (9c), the cases of rendering it wider or narrower than the normal length pre-pit size are indicated as WD and NR respectively. As the width is changed, the addition signals have the peak signal amplitudes changed to be larger and smaller against the signal SNM of the normal pre-pit respectively without having the signals shifted in the time-base direction as with SWG and SNR respectively, and the push-pull signals remain 0 and unchanged as PWD and PNR against the signal PNM of the normal length pre-pit respectively.

In this case, the cutting needs to modulate the strength of the recording power and control the pulse width so as not to have the beginning and end of the long pre-pit displaced, and so the control is difficult but not too difficult to implement. On the contrary, it is also possible to perform the displacement so as to change only the power as with a short pre-pit and allow increase and decrease on both sides of the edge.

Figure 10:
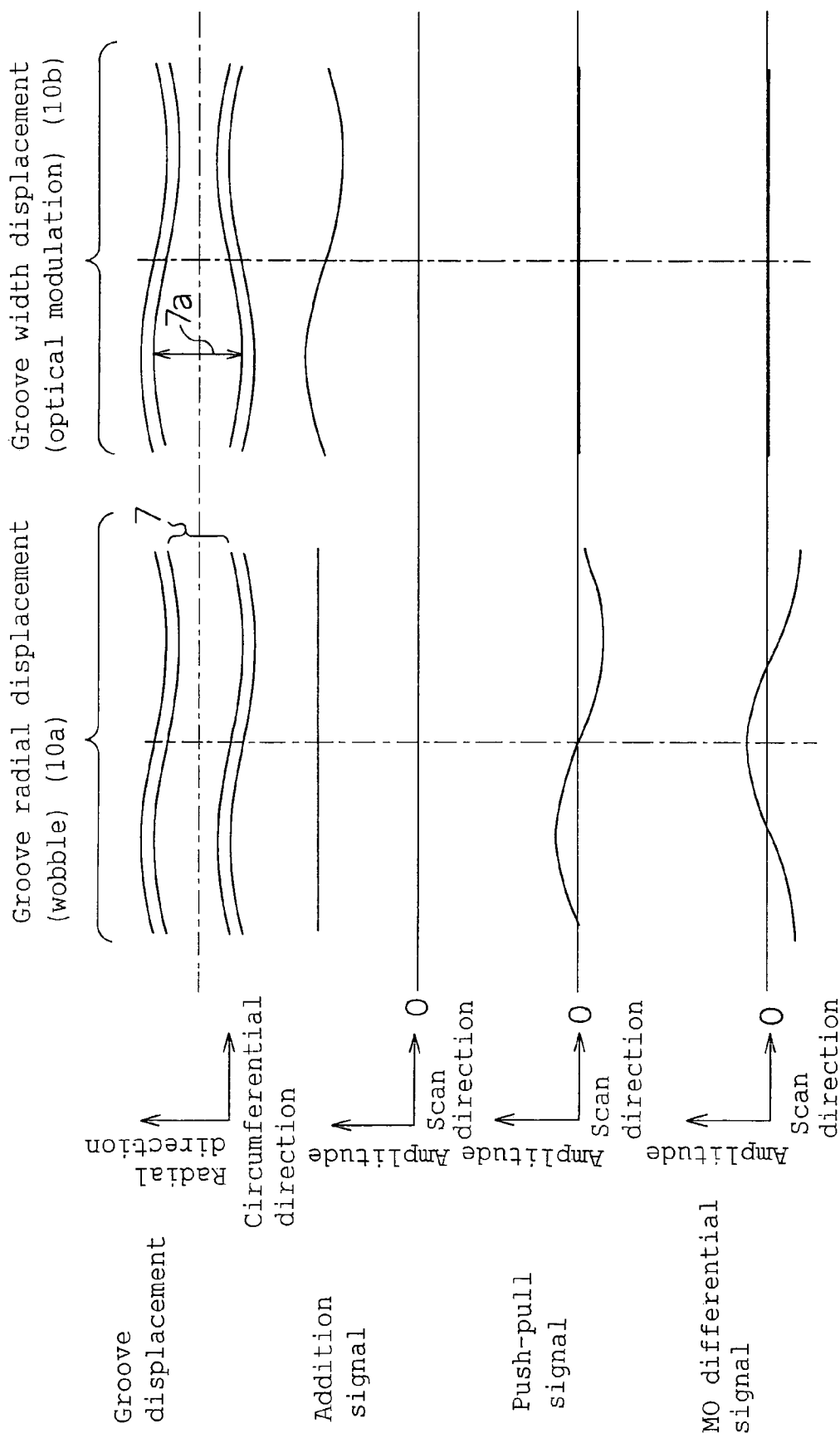
FIG. 10 is a diagram showing a concrete example (4) of the minute displacements according to the embodiment of the present invention.

FIG. 10 shows an example of recording the secret information 102 by minutely displacing the grooves shown by the number 7 in FIG. 6.

In FIG. 10, reference numeral 10a denotes the displacement (wobble) of the grooves 7 in the radial direction, and reference numeral 10b denotes the displacement (change) of a width 7a of the grooves 7. They indicate the (i) groove displacements, (ii) addition signal, (iii) push-pull signal and (iv) MO differential signal from the top downward in the drawing respectively. The MO differential signal is effective in the case where a recording material of the optical disk is magneto-optical. Their respective horizontal and vertical axes are the circumferential/radial and the scanning direction/amplitude for the remaining three items.

The radial displacement of the grooves indicated by reference numeral 10a is a generally used wobble method which is implemented by deflecting the light beam on cutting according to the predetermined rule. It is possible to place unit information there on by phase shift keying, frequency modulation and soon. It is necessary, however, to hold it down to a rate of change exerting no influence over the recording and reproduction. 1 bit of the secret information 102 is determined by collecting a plurality of pieces of the unit information. As shown in the drawing, according to the wobble method, there is no change in the addition signal but the push-pull signal and MO differential signal change in the displacement direction of the grooves 7. It is possible, by detecting this, to reproduce the secret information 102.

The displacement of the groove width indicated by reference numeral 10b can be implemented by light beam strength on cutting. It is required, as a matter of course, to hold it down to the displacement of a level not eliminating a land to be provided between it and an adjacent track. In the case of this displacement, only the addition signal changes according to the change in the groove width as opposed to the case of reference numeral 10a, and so the secret information 102 is reproduced by detecting it. Although it is not shown, it is possible, as a matter of course, to take a recording method whereby duplication of the secret information is difficult by combining the radial and width displacements of the grooves.

As described above, the secret information has its 1 bit implemented by collecting the plurality of pieces of unit information on the minute displacements of the concavities and convexities (embosses) formed on an optical disk substrate. To be more precise, the emboss portions of 1 to 7 shown in FIG. 6 should be minutely displaced in the forms suited to them.

However, it is desirable, in view of the signal quality, not to displace the emboss portion which is a reference clock of a sample servo, such as the rotative direction of the second wobble 2. It is not necessary to limit the secret information to the embosses as in this embodiment, but it is also possible to render unit recording as minute displacements of the recording marks in the cases of the rewritable type and write-once type optical disks.

It goes without saying that the unit information constituting 1 bit of the secret information is not limited to one type of various minute displacements described above, but it is possible, as a matter of course, to constitute it by combining the unit information in the displacements.

Figure 13:
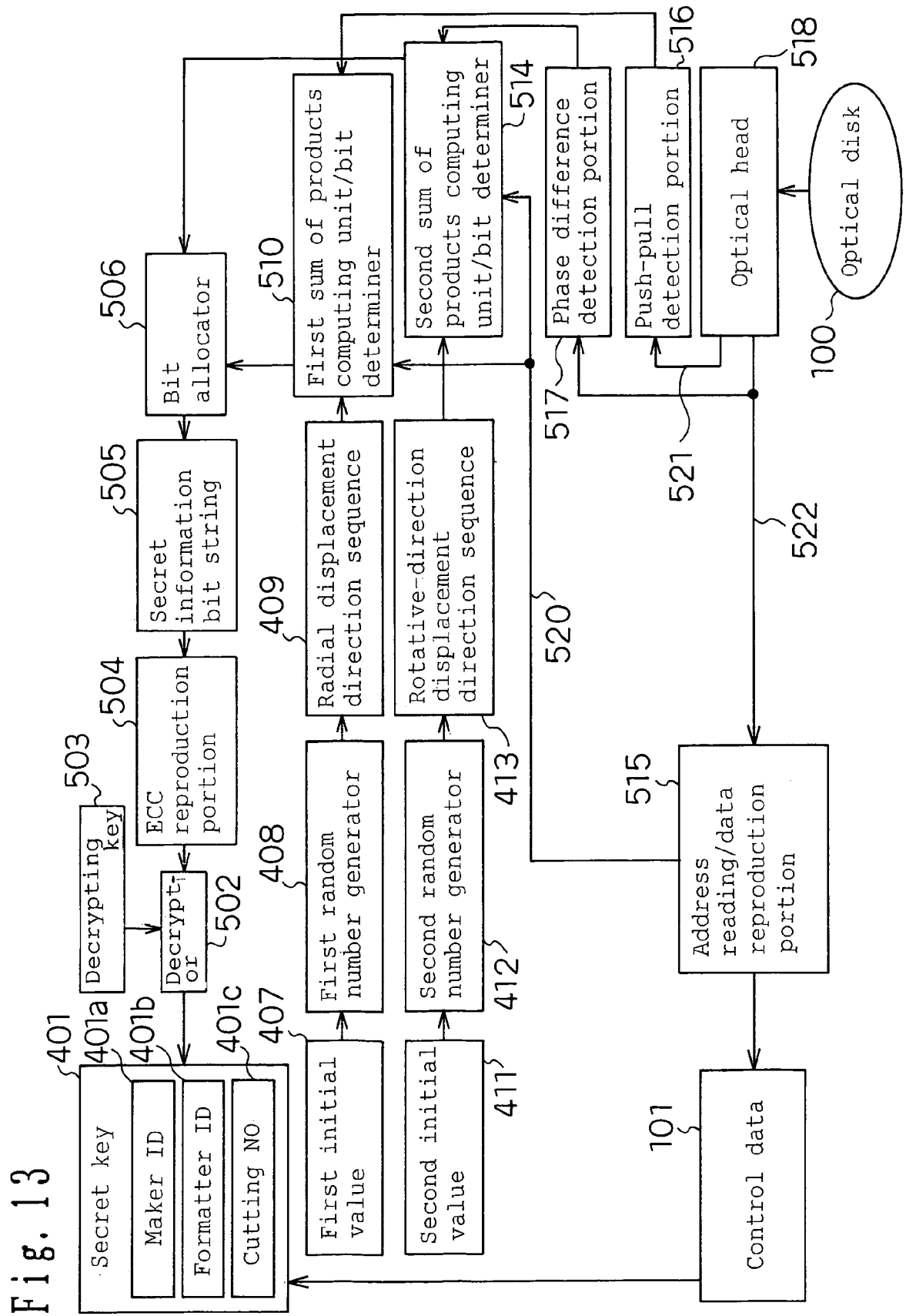
FIG. 13 is a block diagram of a secret information reproduction system according to the embodiment of the present invention.

The methods of physically recording the secret information 102 on the optical disk were described above as "concrete examples of minute displacements." Next, the embodiments of the recording and reproduction method of the secret information 102 will be described by dividing it into the recording method (FIGS. 11 and 12) and the reproduction method (FIGS. 13 and 14).

Figure 11:
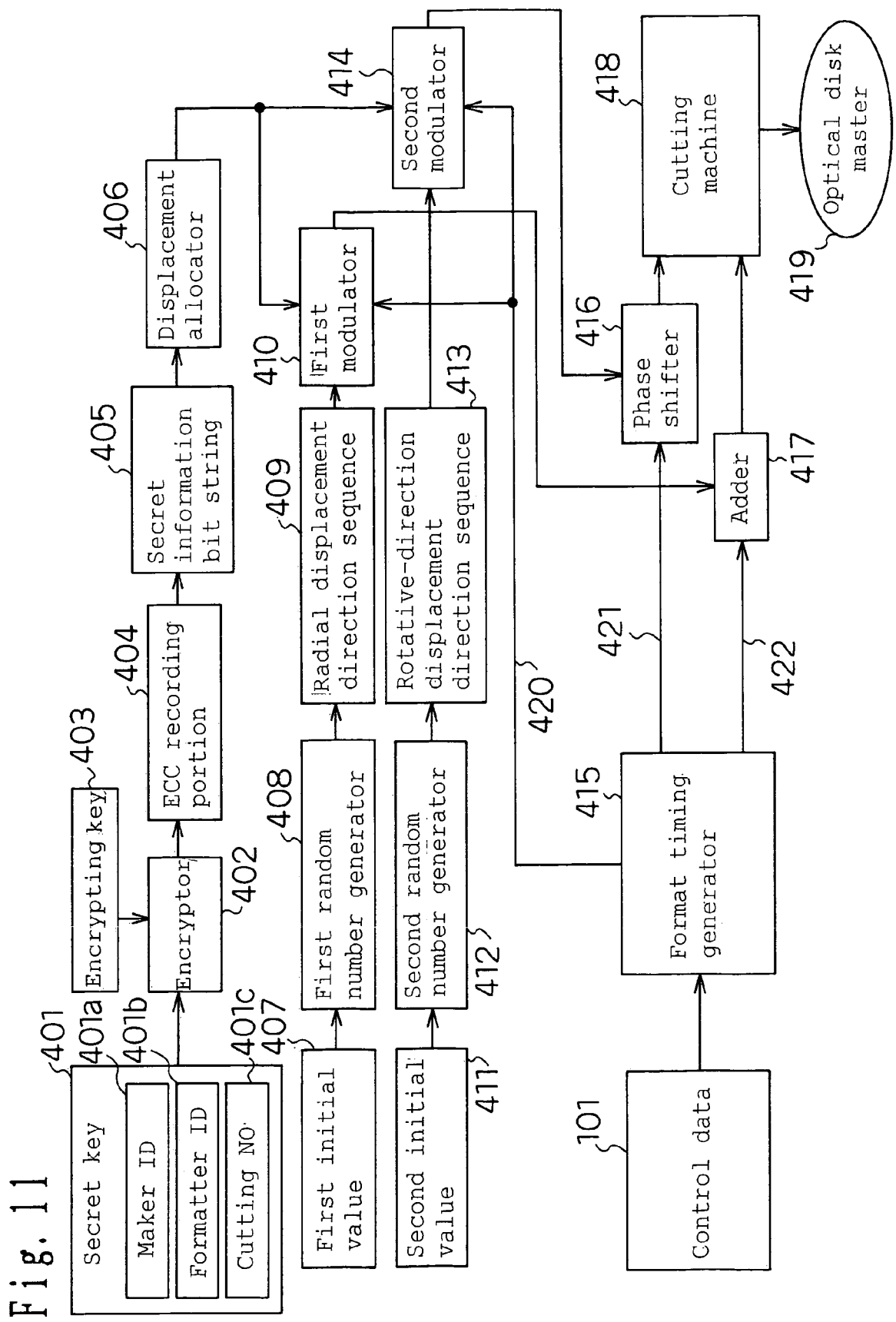
FIG. 11 is a block diagram of a secret information recording system according to the embodiment of the present invention.

First, the recording method will be described. FIG. 11 is a block diagram of a system of cutting the secret information 102 and recording it on an optical disk master 419, which system is the apparatus called a formatter except the cutting machine 418 and optical disk master 419.

The substrate of the optical disk 100 is created in the process of developing the above described optical disk master 419, creating the stamper and resin formation with the stamper.

In FIG. 11, reference numeral 401 denotes a secret key, which is the information including at least the information on a maker ID 401a, a formatter ID 401b and a cutting NO 401c and is given from the above described License administrative organization 300.

A part or all of the information on the secret key 401 is sent to an encryptor 402. Of the secret key 401, the remaining information at least not sent to the encryptor 402 is recorded as a part of the control data 101.

The control data 101 is sent to a format timing generator 415 and is recorded on the optical disk master 419.

A part of the information sent from the secret key 401 to the encryptor 402 may be used for so-called certification wherein it is also redundantly recorded on the control data 101 so as to compare the information from the control data 101 to the information from the secret information 102 and check that they are matching on reproduction.

The information sent to the encryptor 402 is cut as the secret information 102 on the optical disk master 419 as described below. To be more specific, it is first encrypted by an encrypting key 403, has an ECC (Error Correction Code) added thereto by an ECC recording portion 404, and is constituted as a secret information bit string 405 and inputted to a displacement allocator 406. The displacement allocator 406 provides instructions to a first modulator 410 or a second modulator 414 for each bit number stored in the secret information bit string 405.

Both the first modulator 410 and second modulator 414 have a timing signal 420 of forming the pre-pit from the format timing generator 415 inputted thereto, and provide the radial minute displacement and rotative-direction minute displacement respectively.

The above described radial minute displacement is a signal generated by the format timing generator 415. And to implement it, an adder 417 is used to superimpose an amount equivalent to the minute displacement on an optical deflection signal indicated by reference numeral 422 of deflecting in the radial direction of the light beam radiated to the optical disk master 419 from the cutting machine 418 and forming the wobble bit of the sample servo so as to minutely displace the pre-pit in the radial direction.

The direction of deflection is determined by the value of a radial displacement direction sequence 409 generated from the information on a first random number generator 408 of which initial value is a first initial value 407.

The above described rotative-direction minute displacement is a signal generated by the format timing generator 415. And to implement it, a phase shifter 416 is used to minutely shift timing of an optical modulation signal indicated by reference numeral 421 of modulating the optical strength of the light beam radiated to the optical disk master 419 from the cutting machine 418 so as to minutely displace the pre-pit in the radial direction.

The direction of a phase shift is determined by the value of a rotative-direction displacement direction sequence 413 generated from the information on a second random number generator 412 of which initial value is a second initial value 411.

The first random number generator 408 and second random number generator 412 always generate the same sequence as with an M-series random number generator once the order and the initial value are determined. While areas of the pre-pit and so on are minutely displaced per unit by random numbers, it is basic to render the value almost 0 in the case of integrating the displacement so as to exert no influence over primary pre-pit detection in a low-frequency area.

A description will be given by using FIG. 12 as to a concrete operation example of the formatter described above.

(12a) in FIG. 12 shows an operation example of the displacement allocator 406. In this example, the secret information bit string 405 is comprised of a bit string of eight bits of the bit numbers 0 to 7, and is inputted to the displacement allocator 406 by two bits from the high order. (12a1) shows an example of inputting the secret information bits, showing the status of having two bits of the bit number 3 (bit 3) and bit number 2 (bit 2) inputted as one set. Only the bit numbers 2 and 3 are described below, but other bit numbers are also handled likewise.

Each bit of the bit string has the displacement specified either in the rotative direction (displacement area=1) or in the radial direction (displacement area=0) based on a bit displacement area allocation table shown in (12a3). In this example, the minute displacement in the radial direction is specified as to the bit 3 because it is displacement area=0, and the minute displacement in the rotative direction is specified as to the bit 2 because it is displacement area=1. The displacement allocation portion shown in (12a2) has the secret information bits (12a1) and the bit displacement area allocation table (12a3) inputted thereto, and the information is sent to the first modulator 410 for the radial displacement and second modulator 414 for rotative-direction displacement respectively. As the bit number 3 is specified as the radial direction, the value "1" thereof is sent to the first modulator 410. As the bit number 2 is specified as the rotative direction, the value "0" thereof is sent to the second modulator 414.

(12b) describes the operation in the radial direction related to the bit number 3. The first modulator 410 first has the radial displacement direction sequence 409 (12b1) having one of the values "−1," "0" and "+1" as its element inputted thereto, and stores the results of multiplying each element by the value "1" of the bit number 3 in a calculation result sequence (12b2). When the value is "0", it is multiplied by −1 so that the displacement is rendered symmetrical to the case where the value is "1." The minute displacement is based on the calculation result sequence. To be more specific, the pre-pit to be recorded on the optical disk master 419 is displaced to the inner radius when the value of the calculation result sequence is "−1," remains as-is without displacement when it is "0," and is displaced to the circumference when it is "+1" as against the original recording position.

In this embodiment, a description was given as to the case where the displacement direction sequences 409 and 413 are predetermined 16 bits and have the predetermined patterns shown in FIG. 12. However, it is not limited there to but it may be a configuration wherein the displacement direction sequences have the number of bits other than 16 bits and patterns other than the ones shown in FIG. 12 are used.

As for the operation of the for matter, it determines the information on the pre-pit to be recorded by the first modulator 410 from the timing signal 420, adds to the adder 417 the values of the calculation result sequence (12b2) accommodating the displacement to be given to each pre-pit in order, and modulates the optical deflection signal 422 to input it to the cutting machine 418. The optical deflection signal 422 having passed through the adder 417 becomes voltage values wherein offset voltages of "−D," "0" and "+D" are added to the signal volume before the passage by outputs "−1," "0" and "+1" of the first modulator 410. Here, D is the voltage value capable of providing a predetermined minute displacement to a deflector in the cutting machine 418.

(12b3) shows the results with a pre-pit sequence, where the pre-pit in the broken line has no displacement and the pre-pit in the solid line has the above described radial displacement implemented thereon.

However, this drawing shows the appearance in the case of having no rotative-direction displacement subsequently described. And in fact, it is synthesized with the rotative-direction displacement (a rotative-direction pit displacement component 12c3 in FIG. 12) so as to form the pre-pit minutely displaced as the solid line of a "synthesized pre-pit displacement" shown in (12d).

The values "−1," "0" and "+1" of the radial displacement direction sequences 409 are determined by the input from the first random number generator 408. When the input is binary, "−1", "0," "+1" and "0" are associated with input bits of "00," "01," "10" and "11" by using two bits as one set. In this case, "−1" and "+1" have the same frequency of appearance, and "0" has a double frequency of appearance thereof due to the nature of the random numbers. To render the frequency of appearance of "0" the same, a method such as inputting next two bits when the input bit is "11" is thinkable. It is also possible, when "0" is not particularly necessary, to associate "−1" and "+1" with "0" and "1" of the input 1 bit.

As for the reasons for creating the pre-pit without displacement by specifying "0," one is to reinforce resistance to the hack from the outside and so on, and the other is to enhance signal processing performance by correctly inputting original pre-pit positions to a signal processing system.

In the latter case, it is possible to know which pre-pit has not been displaced by means of the above described displacement direction sequence 409 in the radial direction, and so detection accuracy of the timing can be improved by filtering based on it.

A minute displacement amount given to the pre-pit is primarily at a level exerting no influence over the original signal. However, it nonetheless deteriorates a jitter of the original reproduction signal, and so it can be effective, depending on the modulation method, to create the pre-pit not displaced with "0" and render it as a reference.

As described above, it is thinkable that interweaving with the original area without displacement is also effective to the areas to be displaced shown in FIGS. 7 to 10 without depending on the minutely displaced areas.

The second modulator 414 related to the bit number 2 performs almost the same operation as the first modulator 410 (12c). The difference is that the direction of the minute displacement is in the rotative direction instead of the radial direction. To be more specific, the second modulator 414 first has the rotative-direction displacement direction sequence 413 (12c1) having one of the values "−1," "0" and "+1" as its element inputted thereto, and stores the results of multiplying each element by −1 equivalent to the value "0" of the bit number 2 in the calculation result sequence (12c2). Based on this, the pre-pit to be recorded on the optical disk master 419 is displaced on the left side (the side advancing to the time base) when the value of the calculation result sequence is "−1", remains as is without displacement when it is "0", and is displaced to the right side (the side delaying against the time base) when it is "+1" as against the original recording position. Here, a scanning direction on recording and reproducing an optical spot is from the left to the right in the drawing.

As for the operation of the formatter, it determines the information on the pre-pit to be recorded by the second modulator 414 from the timing signal 420, sends to the phase shifter 416 the values of the calculation result sequence (12c2) accommodating the displacement to be given to each pre-pit in order, and changes a delay amount of the optical modulation signal 421 according to the values so as to control the timing of light beam emission time of the cutting machine 418. The optical modulation signal 421 having passed through the phase shifter 416 is given delay times of "0," "d" and "2d" by the outputs "−1," "0" and "+1" of the second modulator 414. Here, d is the time equivalent to the rotative-direction minute displacement, which is the value determined based on the relationship with the number of revolutions of the optical disk master 419, usually given the delay time of "d" equivalent to the input "0" when the displacement is not provided.

As described above, the information on the bit numbers 3 and 2 of the secret information is corresponding to the radial and rotative-direction minute displacements respectively (refer to the radial pit displacement component (12b3) and rotative-direction pit displacement component (12c3) in FIG. 12) so as to be eventually recorded on the predetermined 16 pre-pits as the synthesized pit displacements (12d) shown in FIG. 12.

The level of the minute displacements is the level at which, as the minute amount exerting little influence over the original position of the pre-pit, SNR (Signal-to-Noise Ratio) is low and the displacement amount cannot be correctly measured just by one pre-pit. This is the point of the secret information, and the secret information may also be called hidden information, which collects the minute displacement amounts from a plurality of predetermined pre-pits so as to clarify, only after then, whether the 1 bit of the secret information is "0," "1" or "unrecorded," that is, apparently no minute displacement is embedded. It should be "unrecorded" in the case of the pirated optical disk.

Next, the method of reproducing the secret information 102 will be described.

FIG. 13 is a block diagram of a system of reading the secret information 102 recorded as the minute displacement amount of the pre-pit on the optical disk 100. The system shown in this drawing other than the optical disk 100 is included in the optical disk drive 200, and has the functions centering on the secret information demodulator 201 of the license protection system.

The optical disk 100 has the secret key 401 processed as the secret information and recorded thereon as the minute displacements of the pre-pits via the optical disk master 419 by the above described recording system. The reproduction system described hereafter reads the secret key 401 in reverse order to that of the recording system.

In FIG. 13, the same portions as those in the recording system in FIG. 11 are given the same numbers.

To be more precise, the first initial value 407, first random number generator 408, radial displacement direction sequence 409, second initial value 411, first random number generator 412 and rotative-direction displacement direction sequence 413 should be the same as those in the recording system. The secret key 401 set up by the recording system and the information included therein are reproduced by using them. The control data 101 also has the same data as what is recorded reproduced.

In FIG. 13, reference numeral 518 denotes the optical head which scans the pre-pit on the optical disk 100 with the light beam to reproduce an addition signal 522 indicating a pre-pit amplitude and a push-pull signal 521 indicating the rotative-direction displacement of the pre-pit. The former signal is sent to an address reading/data reproduction portion 515 and a phase difference detection portion 517, and the latter signal is sent to a push-pull detection portion 516.

The address reading/data reproduction portion 515 reads a track address of the optical disk 100 being focus-tracked by the optical head 518, reproduces the user data (not shown) in the normal data area 105 and the control data 101, and also outputs as a timing signal 520 a predetermined pre-pit position at which the secret information 102 is recorded.

With a reference pre-pit having no radial displacement as 0, the push-pull detection portion 516 standardizes the positive and negative of the inputted push-pull signal 521 with the signal amplitude (including disturbance absorption such as reflectance) of the reference pre-pit, and sends them to a first sum of products computing unit/bit determiner 510 as the minute displacements in the circumference and inner radius directions of the pre-pits.

This signal is inputted to the first sum of products computing unit/bit determiner 510 as a positive signal when the pre-pit is displaced to the circumference with the inner radius as a negative signal, where a product with an element of the radial displacement direction sequence 409 is calculated per predetermined pre-pit, and the sum of the plurality of related pre-pits is calculated in order to determine the value of the bit of the recorded secret information.

The value of the secret information in the radial direction which is the result of the bit determination is sent to a bit allocator 506 of performing a reverse function to the displacement allocator 406 of the recording system.

The phase difference detection portion 517 generates by PLL a reference timing signal equivalent to an original pre-pit position from the pre-pit which is a clock reference of the addition signal 522 and/or the sample servo, detects the difference between each pre-pit and the reference timing signal as a phase difference, and sends it as the rotative-direction displacement of each pre-pit to a second sum of products computing unit/bit determiner 514.

This signal is inputted to the second sum of products computing unit/bit determiner 514 as the positive signal when the timing of the pre-pit is earlier than the original time and as the negative signal when it is later. The product with the element of the rotative-direction displacement direction sequence 413 is calculated per predetermined pre-pit, and the sum of the plurality of related pre-pits is calculated in order to determine the value of the bit of the recorded secret information.

The value of the secret information in the rotative direction which is the result of bit determination is sent to the bit allocator 506 as with the value of the secret information in the radial direction.

The bit allocator 506 returns the inputted results of bit determination in the rotative and radial directions to the secret information bit string 505 in the same way of allocation as the recording method.

The secret information bit string 505 undergoes error correction in the ECC reproduction portion 504, and is decrypted by a decryptor 502 by using a decrypting key 503 having the same value as the encrypting key 403 so as to restore the secret key 401 together with the control data 101.

The secret key 401 is the information becoming the disk key 204 which is a core part of the license protection system of the present invention by way of the process of the disk infringement determination/disk key generation portion 203 shown in FIG. 1.

Next, a more concrete example of the playback system will be described by using FIG. 14.

This example is ready for the reproduction of the secret information embedded in the pre-pits by the recording method in FIG. 12, and reproduces the secret information in the reverse order to the recording.

To be more specific, the pre-pit sequence of the secret information is extracted by the timing signal 520 of the address reading/data reproduction portion 515 as shown by a "secret information track scan" in (14d).

In this minute displacement of the pre-pit sequence, the radial component (vertical direction in the drawing) and rotative-direction component (horizontal direction in the drawing) are decomposed and extracted as the push-pull signal 521 and the addition signal 522 respectively, and a radial secret information bit operation shown in (14b) and a rotative-direction bit operation shown in (14c) are performed respectively.

The radial secret information bit operation (14b) is performed in the first sum of products computing unit/bit determiner 510.

First, the result from the push-pull detection portion 516 is a push-pull signal detection result sequence shown in (14b3). Consequently, the values of the elements of the sequence become many values of an AD converter and so on in reality. For the sake of simplicity, however, they are simplified and indicated here as "−1" when the minute displacement is on the inner radius side, "0" when there is no displacement, and "+1" when the minute displacement is on the circumference side.

Next, the sum of products with the element of the radial displacement direction sequence 409 shown in (14b1) is calculated to obtain the result thereof shown in (14b2).

In this example, there is no error in a push-pull signal detection result sequence, and so it begins with the first element calculation result "0" and the calculation result of all the 16 elements becomes "+11." The first sum of products computing unit/bit determiner 510 arranges this calculation result so that, for instance, the original secret information bits of "−11" to "−3," "−2" to "+2" and "+3" to "+11" are determined as "0," "nul" and "1" respectively.

Consequently, the value of the secret information bit here is determined as "1," and is passed to a bit demodulation allocation (14a) of the bit allocator 506.

The rotative-direction secret information bit operation (14c) is performed in the second sum of products computing unit/bit determiner 514. As with the radial direction, the rotative-direction displacement direction sequence 413 (14c1) and phase difference signal detection result sequence (14c3) are prepared, the sum of products is calculated (14c2) to obtain the result "−11," and the value of the secret information bit is determined as "0" and is passed to a bit demodulation allocation (14a) of the bit allocator 506.

The bit allocator 506 contains the same bit displacement area allocation table as the one used on recording as shown in (14a3). The radial displacement at this time is the bit number 3 of the secret information, and the rotative-direction displacement is allocated to the bit number 2 of the secret information (14a2).

This information is outputted as a secret information bit output as shown in (14a1) so as to form the secret information bit string 505.

As described in the above embodiment, the optical disk according to the present invention and/or the optical disk constituting the license protection system of the optical disk drive are/is characterized by having one or both of (1) the secret information recorded in the form only reproducible by a special reproduction means and (2) the encrypted data key list which was recorded, after performing a second encrypting to one data key of performing a first encrypting to the user data and recording it with the predetermined number of numbered license keys respectively and generating a list of the same number of the encrypted data keys as the above described predetermined number, by changing to nullified keys the above described encrypted data keys corresponding to the infringement license keys stored in all the optical disk drives having infringed on the license conditions by the point in time in the above described list and constituting the above described list to be searchable with the above described numbers, and in that (3) the user data is encrypted by using, as the encrypting key, one of the disk key generated based on the above described secret information, the data key demodulated by the above described license keys and not being the above described nullified key, and a secret data key combining the above described disk key and the above described data key, and is recorded in one of the forms of the reproduction-only, write-once and rewritable types.

Thus, the user data is encrypted and decrypted by the secret information provided by the License administrative organization (corresponding to the first information of the present invention), the encrypted data key list 104 (corresponding to the third information of the present invention), the license keys (to be more specific, the information stored in the license key storage portion 205 of the optical disk drive 200 of recording and reproducing the data on the optical disk of the present invention, for instance), and the disk key and data key created respectively. Therefore, the pirated optical disks and optical disk drives not based on the license cannot derive the correct disk keys and data keys so that they cannot correctly encrypt and decrypt the user data.

The above described optical disk constituting the license protection system of the optical disk and/or the optical disk drive are/is characterized by including all or a part of (4) the infringement disk list on which the secret information corresponding to the optical disks infringing on the license conditions is recorded, (5) in the case of the optical disks having the recording area, the first infringement drive list on which the numbers of the infringement license keys stored in the optical disk drives infringing on the license conditions are added and recorded as the infringement numbers, and (6) in the case of the optical disks having the recording area, the second infringement disk list on which the secret information corresponding to the optical disks infringing on the license conditions is recorded.

Thus, it is possible to effectively protect the license by rendering unusable as promptly as possible the optical disks and optical disk drives infringing on the license from the infringement disk list 103 (corresponding to the second information of the present invention), the first infringement drive list 108 (corresponding to the fourth information of the present invention) and the second infringement disk list (corresponding to the above "the infringement disk list placed in a recording area").

The above described optical disk constituting the license protection system of the optical disk and/or optical disk drive is characterized in that the above described secret information is comprised of one or more information bits, 1 bit of the above described information bit is associated with the pre-pit displacement of one or more pre-pits embossed on the above described optical disk and/or a groove displacement of the groove of a specific length based on the predetermined rule according to whether the value of the above described 1 bit is "0" or "1," the above described pre-pit displacement is the minute displacement which will not impair the original information carried by the above described pre-pit, that is, the minute displacement of a radial edge of the above described pre-pit and/or the minute displacement of a rotative-direction edge and/or the minute displacement of the size of the above described pre-pit, and the above described groove displacement is the minute change which will not impair the original role of the above described groove, that is, the minute displacement of the above described groove in the radial direction or the minute displacement of the groove width.

Thus, it is possible to prevent creation of the pirated disks because the secret information is difficult to analyze.

The above described optical disk constituting the license protection system of the optical disk and/or optical disk drive is the optical disk of a sample servo method comprised of a plurality of information tracks, characterized in that the above described information track is comprised of a plurality of segments, and the above described segment is comprised of the servo area having at least a pair of wobble pits for the above described sample servo and the address pit for the track address embossed and placed therein and the data area for recording the data, the above described data area has an embossed area for the control data provided therein, having the configuration wherein a head pit and an end pit of specific length are recorded at the beginning and end respectively in order to determine the above described servo area, and the above described control data information is recorded as a control data pit between the above described head pit and end pit based on a specific modulation rule, and the pre-pits carrying the above described secret information are the above described wobble pit, the above described address pit, the above described head pit, the above described end pit and/or control data pit, and the pre-pit change is a minute amount exerting no influence over servo performance, address reading and control data reading.

Thus, in the case of the above described optical disk of the sample servo method, it is possible to select a hiding place of the secret information from many kinds of displacements so as to allow strong and effective license protection.

Essential portions of the invention of the above examples related to the present invention relating to the optical disk described above and invented by the inventors hereof will be disclosed below.

The contents of the essential portions of the invention to be described below are (1) the invention relating to the license protection system of the optical disk and optical disk drive (first group invention), (2) the invention relating to the license protection system of the optical disk (second group invention), (3) the invention relating to the license protection system of the optical disk drive (third group invention), (4) the invention relating to the optical disk drive (fourth group invention) and (5) the invention relating to the recording and reproduction method of the secret information (fifth group invention).

The above group inventions are intended to provide the technology related to the license protection of the optical disk and optical disk drive system in order to solve the problems of the above-mentioned technology in the past, which is a totally new concept different from the copyright protection in the past.

To be more precise, an object thereof is to provide the license protection system of the optical disk and/or optical disk drive in which the optical disks and optical disk drives cannot be created without being licensed, and the optical disk, optical disk drive and optical disk manufacturing apparatus thereof. Another object is to provide to the market the optical disk system having a base capable of implementing stronger copyright protection means as a result of introducing the license protection system of the present invention.

(1) The first group invention related to the present invention is the license protection system of the optical disk and/or optical disk drive, characterized in that the components thereof are at least the optical disk on which at least first special information (corresponding to the first information of the present invention, which is relevant to the secret information 102 and so on for instance, to be more precise) to be provided only to the optical disk manufacturer (medium licensee) licensed by the licensor and managed by the License administrative organization founded by involving the above described licensor is recorded, and the optical disk drive comprising storage means in which second special information (relevant to the information recorded in the license key storage portion 205 for instance, to be more precise) to be provided only to the optical disk drive manufacturer (drive licensee) licensed by the licensor and managed by the above described License administrative organization is stored, key generation means of generating key data from the above described first special information and/or second special information, recording and reproduction means of encrypting inputted user data with the above described key data to record it on the above described optical disk and reading the encrypted user data from the above described optical disk and decrypting it with the above described key data to output it as the user data, and recording and reproduction prohibition means of prohibiting the operation of the above described recording and reproduction means in the case where the above described first special information is illegitimate or does not exist and/or the above described second special information is illegitimate, and a part or all of the information relating to the above described first special information, the above described second special information, the above described storage means, the above described key generation means, the above described recording and reproduction means and the above described recording and reproduction prohibition means is managed as the special information unique to the licensor and is provided only to the above described medium licensee and/or drive licensee by the above described License administrative organization in the form of limited disclosure or similar to a black box.

Thus, the illegitimate optical disk manufactured by an unlawful optical disk manufacturer who is unlicensed does not have the above described first special information recorded thereon, and so it cannot be recorded and reproduced on a legitimate optical disk drive manufactured by the optical disk manufacturer who is licensed.

The unlawful optical disk manufacturer who is unlicensed cannot obtain the above described second special information and the secret information unique to the above described licensor, and so that manufacturer can only produce the illegitimate pirated optical disk drive incapable of decrypting and reproducing the above described encrypted recording. Therefore, that manufacturer cannot reproduce the encrypted user data on the optical disk which was recorded and reproduced by being legitimately licensed.

Even though the user data can be recorded on the legitimate optical disk without encrypting it, the legitimate optical disk drive decrypts the recorded user data so that the original information is not restored. For that reason, it is possible to allow no exchange of data between the above described pirated optical disk drive and the legitimate optical disk drive so as to purposely eliminate illegitimate compatibility. To be more specific, it is possible to exclude both the illegitimate optical disk and illegitimate optical disk drive from the optical disk system comprised of the optical disk and optical disk drive which are licensed and legitimately manufactured so as to consequently protect the rights of the licensor.

To be more specific, it is feasible to prevent the pirated optical disks and optical disk drives from being easily manufactured and marketed by the unlawful manufacturer who is unlicensed and protect the rights of the licensor. According to the present invention, it is feasible, as the creation of the pirated optical disks and optical disk drives is impossible and also the user data is protected by the encryption, to provide an excellent optical disk system which is highly secure and usable for distribution and storage of the contents without anxiety.

(2) Furthermore, the first feature in the above second group is the license protection system of the optical disk, characterized in that the components thereof are at least the optical disk on which the secret information is recorded in the form reproducible only by special reproduction means, the encrypting key is generated based on the above described secret information, and the user data encrypted by the above described encrypting key is recorded as the encrypted data in the form of the reproduction-only, write-once or rewritable type, and an optical disk drive comprising special reproduction means of reading the above described secret information from the above described optical disk, reproduction control means of prohibiting the recording and reproduction operation thereafter when the above described secret information is not correctly reproduced and generating the above described encrypting key based on the above described secret information when the above described secret information is reproduced, reproduction means of reading the above described encrypted data and decrypting it with the above described encrypting key as the decrypting key to output the user data, and recording means of, in the case where the above described optical disk has the recording area, inputting the user data and encrypting the above described inputted user data with the above described encrypting key to record it in the recording area of the above described optical disk, and a part or all of the information relating to the above described secret information, the recording form of the above described secret information, the generation method of the above described encrypting key, the encrypting method of the above described user data, the above described special reproduction means, the above described reproduction control means, the above described reproduction means and the above described recording means is provided only to the medium licensee and/or drive licensee by the above described License administrative organization in the form of limited disclosure or similar to a black box.

Thus, the pirated optical disk manufactured by the unlicensed manufacturer cannot have the secret information easily recorded thereon, and so the optical disk will be meaningless being unable to record and reproduce the user data, resulting in protection of the license of the optical disk.

The second feature in the above second group is the license protection system of the above described optical disk according to the above described first feature, characterized in that the above described optical disk is the one further having different contents of the above described secret information per predetermined number of the above described optical disks and having the secret information corresponding to the optical disks infringing on the license conditions (corresponding to the second information of the present invention, which is relevant to the specific secret information recorded on the infringement disk list 103 for instance, to be more precise) recorded as the infringement disk list, and the above described optical disk drive further has the infringement disk storage table of appending the infringement disks recorded on the above described infringement disk list, write-once means of reproducing the above described infringement disk list every time the above described optical disk is mounted and on discovering the secret information corresponding to the infringement disk not recorded in the above described infringement disk storage table, appending the secret information corresponding to the above described discovered infringement disk to the above described infringement disk storage table, and the recording and reproduction prohibition means of prohibiting the recording and reproduction thereafter in the case where the secret information reproduced by the above described special reproduction means is recorded in the above described infringement disk storage table, and when the above described optical disk is newly created, the secret information corresponding to all the optical disks infringing on the license conditions discovered up to that point in time is provided as the above described infringement disk list by the above described License administrative organization.

Thus, in the case where it turned out that the optical disks having recorded the secret information thereon by infringing on the license are on the market as the pirated optical disks, it is possible, by recording the information on the above described pirated optical disks as the infringement information on the legitimate optical disk and appending and accumulating that information on the optical disk drive, to prohibit the recording and reproduction on the infringement disks to render them unusable so as to protect the optical disk license more strongly.

(3) Furthermore, the first feature in the above third group is the license protection system of the optical disk drive, characterized in that the components thereof are at least the optical disk on which the encrypted data key list is recorded, after performing the second encrypting to one data key of performing the first encrypting to the user data and recording it with the predetermined number of numbered license keys respectively and generating a list of the same number of the encrypted data keys as the above described predetermined number, by changing to nullified keys the above described encrypted data keys corresponding to the infringement license keys stored in all the optical disk drives having infringed on the license conditions by the point in time in the above described list and constituting the above described list to be searchable with the above described numbers, and the user data undergoes the first encrypting by the above described data key and is recorded as the encrypted data in the form of the reproduction-only, write-once or rewritable type, and the optical disk drive comprising list reproduction means of reading the above described encrypted data key list from the above described optical disk, license key storage means of storing one or more license keys extracted according to the predetermined rule from the above described predetermined number of numbered license keys, control means of selecting the above described stored license keys one by one and searching for the encrypted data key corresponding to that number to determine whether or not it is the nullified key so as to proceed to a next decrypting process if the searched encrypted data key is not the nullified key or prohibit the recording and reproduction operation thereafter if the encrypted data corresponding to all the license keys in the above described license key storage means are the nullified keys, decrypting means of, when the decrypting is ordered by the above described control means, performing the second decrypting to the above described searched encrypted data key with the above described selected license key as the decrypting key and generating the data key, the reproduction means of reproducing the encrypted data from the above described optical disk and performing the first decrypting with the above described data key as the decrypting key to output the user data, and the recording means of, in the case where the above described optical disk has the recording area, inputting the user data and performing the first encrypting to the above described inputted user data with the above described data key as the encrypting key to record it in the recording area of the above described optical disk, and a part or all of the information on the above described data key, the above described license key, the above described first encrypting and decrypting methods, the above described second encrypting and decrypting methods, the above described encrypted data key list, the above described nullified keys, the above described list reproduction means, the above described license key storage means, the above described control means, the above described decrypting means, the above described reproduction means and the above described recording means is provided only to the medium licensee and/or drive licensee by the License administrative organization in the form of limited disclosure or similar to a black box.

Thus, the unlicensed person cannot obtain the encrypting and decrypting methods of the user data and a correct license key so that the pirated version of the optical disk cannot be easily created. Even if the optical disk drive which is seemingly the same as the legitimate one is created by obtaining the information, materials and so on by unlawful means, the License administrative organization can find out the pirated optical disk drive and render it unusable by nullifying the corresponding license key and reflecting it on the optical disks thereafter. The license of the optical disk drive can be securely protected by the above method.

The second feature in the above third group is the license protection system of the above described optical disk drive according to the above described first invention, characterized in that the above described optical disk having the recording area is the optical disk further having recorded thereon the first infringement drive list on which the numbers of the infringement license keys stored in the optical disk drives infringing on the license conditions are added as the infringement numbers, and the above described optical disk drive is the optical disk drive further having the infringement drive storage table capable of additionally recording the numbers of the infringement license keys stored in the optical disk drives infringing on the license conditions as the infringement numbers, search means of reproducing the above described encrypted data key list and generating the numbers corresponding to the nullified keys as the second infringement drive list every time the above described optical disk is mounted, first infringement number updating means of reproducing the above described first infringement drive list if recorded on the above described optical disk on the above described mounting and appending to the above described first infringement drive list the infringement numbers stored in the above described infringement drive storage table and the above described second infringement drive list but not stored in the above described first infringement drive list, second infringement number updating means of appending to the above described infringement drive storage table the infringement numbers stored in the above described first infringement drive list and the above described second infringement drive list but not stored in the above described infringement drive storage table, and the control means of, in the case where the numbers of the license keys stored in the above described license key storage means match with the infringement numbers stored in the above described first infringement drive list, the above described infringement drive storage table and the above described second infringement drive list, prohibiting the decrypting and encrypting operations by the above described matching license keys.

Thus, it is possible, by the setup capable of adding the information on the optical disk drives having infringed on the license as common information to the optical disks and optical disk drives, to propagate and expand the infringement information fixed on the optical disks and further strengthen the license protection of the optical disk drives.

The third feature in the above third group invention is the license protection system of the optical disk drive of the above described first or second feature, characterized in that the above described optical disk drive is the optical disk drive further having network connection means and third infringement number updating means of taking in the latest infringement numbers provided by the License administrative organization from the above described network connection means and appending to the above described infringement drive storage table the infringement numbers which are not in the above described infringement drive storage table.

Thus, it is possible to transmit the latest infringement information distributable only by sales of the recorded optical disks earlier to the optical disk drives so as to implement more effective license protection of the optical disk drive.

The fourth feature in the above third group invention is the license protection system of the above described optical disk drive according to the above described first, second or third feature, characterized in that the above described optical disk is the optical disk further having recorded thereon the secret information in the form only reproducible by the special reproduction means, and the above described optical disk drive is the optical disk drive further having the special reproduction means of reading the above described secret information from the above described optical disk, the reproduction control means of prohibiting the recording and reproduction operation thereafter when the above described secret information is not correctly reproduced and generating a third encrypting key based on the above described secret information when the above described secret information is reproduced, secret data key generation means of generating a first secret data key having performed a third encrypting to the above described decrypted data key with the data on the above described third encrypting key as the encrypting key or a second secret data key having performed a third encrypting to the above described third encrypting key with the data on the above described decrypted data key as the encrypting key, and the user data on the above described optical disk is recorded in one of the forms of the reproduction-only, write-once and rewritable types as the encrypted data to which the first encrypting has been performed with the above described first secret data key or the above described second secret data key as the encrypting key, and the decrypting key of the above described reproduction means of the above described optical disk drive is the above described first secret data key or the above described second secret data key, and in the case where the above described optical disk has the recording area, the encrypting keys of the above described recording means are the above described first secret data key or the above described second secret data key respectively, and a part or all of the information on the above described secret information, the above described special reproduction means, the above described reproduction control means, the above described secret data key generation means, the above described method of generating the third encrypting key, the above described first secret data key and the above described second secret data key is provided only to the medium licensee and/or drive licensee by the License administrative organization in the form of limited disclosure or similar to a black box, and the license protection system of the above described optical disk drive further has the function of protecting the license of the optical disk.

Thus, it is possible to simultaneously protect the license of the optical disk in addition to the optical disk drive.

The fifth feature in the above third group invention is the license protection system of the optical disk drive according to the above described fourth feature, characterized in that the above described optical disk is the optical disk further having recorded thereon different contents of the above described secret information per predetermined number of the above described optical disks and having the secret information corresponding to the optical disks infringing on the license conditions as the infringement disk list, and the above described optical disk drive further has the infringement disk storage table of appending the infringement disks recorded on the above described infringement disk list, the appending means of reproducing the above described infringement disk list every time the above described optical disk is mounted and on discovering the secret information corresponding to the infringement disk not recorded in the above described infringement disk storage table, appending the secret information corresponding to the above described discovered infringement disk to the above described infringement disk storage table, and the recording and reproduction prohibition means of prohibiting the recording and reproduction thereafter in the case where the secret information reproduced by the above described special reproduction means is recorded in the above described infringement disk storage table, and when the above described optical disk is newly created, the secret information corresponding to all the optical disks infringing on the license conditions discovered up to that point in time is provided as the above described infringement disk list by the above described License administrative organization.

Thus, it is possible to protect the license of the optical disk by prohibiting the recording and reproduction of the optical disks infringing on the license in addition to the license protection of the optical disk drive.

(4) Furthermore, the first feature in the above fourth group is the optical disk drive comprising the first information deciphering means (secret information demodulator 201 for instance) of deciphering the first information (secret information 102 for instance) relating to the unique information given to the specific optical disk manufacturer or specific optical disk recorded on the optical disk (the optical disk 100 in FIG. 1 for instance), the second information storage means (infringement disk storage table 202 for instance) of obtaining the second information of identifying the illegitimate optical disk manufacturer or illegitimate optical disk (information recorded on the infringement disk list 103 for instance), the first determination means (disk infringement determination/disk key generation portion 203 for instance) of determining whether or not the above described optical disk is illegitimate based on the deciphering results of the above described first information deciphering means and the storage contents of the above described second information storage means, and the control means (secret data key generation portion 208, user data decryptor 213 or user data encryptor 214 for instance) of controlling reproduction of the data from the above described optical disk and/or recording of the data on the above described optical disk based on the determination result of the above described determination means.

The second feature in the above fourth group is the optical disk drive according to the above first invention, wherein the above described second information is the information recorded on the above described optical disk in advance and/or obtained via the Internet (the Internet 216 in FIG. 1 for instance).

The third feature in the above fourth group is the optical disk drive according to the above first invention comprising unique information storage means (license key storage portion 205 for instance) of storing apparatus unique information given to a specific optical disk manufacturer or a specific optical disk drive, and second determination means (license key infringement determination/data key decrypting portion 206 for instance)

of reading the above described apparatus unique information and check it against third information (information recorded on the encrypted data key list 104 for instance) on the above described apparatus unique information recorded on the above described optical disk in advance to determine whether or not the above described optical disk drive manufacturer is illegitimate or whether or not the above described optical disk drive is illegitimate, wherein the above described control means also utilizes the determination result of the above described second determination means.

The fourth feature in the above fourth group is the optical disk drive according to the above third feature comprising fourth information storage means (second infringement drive list 210 and infringement drive storage table 212 for instance) of obtaining and storing the fourth information corresponding to the optical disk manufacturer or optical disk drive determined to be illegitimate, and updating means (infringement number updating portion 211 for instance) of updating and recording the above described fourth information in the data area of the above described optical disk based on the storage contents of the above described fourth information storage means, wherein the above described second determination means makes the above described determination by also utilizing the processing result of the above described updating means.

Thus, it is possible to provide the optical disk drive capable of blocking the distribution of the illegitimate optical disks and/or optical disk drives more effectively than before.

Furthermore, the fifth feature in the above fourth group is the optical disk drive constituting the license protection system of the optical disk characterized by comprising the special reproduction means of reading the secret information from the optical disk on which the above described secret information is recorded in the form reproducible only by the special reproduction means and the encrypting key is generated based on the above described secret information and the user data encrypted by the above described encrypting key is recorded as the encrypted data in the form of the reproduction-only, write-once or rewritable type, the reproduction control means of prohibiting the recording and reproduction operation thereafter when the above described secret information is not correctly reproduced and generating the above described encrypting key based on the above described secret information when the above described secret information is reproduced, reproduction means of reading the above described encrypted data and decrypting it with the above described encrypting key as the decrypting key to output the user data, and recording means of, in the case where the above described optical disk has the recording area, inputting the user data and encrypting the above described inputted user data with the above described encrypting key to record it in the recording area of the above described optical disk.

Thus, it is possible to protect the license of the optical disk by rendering the optical disks on which correct secret information is not recorded unable to implement recording and reproduction as the pirated version which is unlicensed.

Furthermore, the sixth feature in the above fourth group is the optical disk drive according to the above fifth feature constituting the license protection system of the optical disk, wherein the above described optical disk is the optical disk characterized by further having different contents of the above described secret information per predetermined number of the above described optical disks and having the secret information corresponding to the optical disks infringing on the license conditions recorded as the infringement disk list, and the above described optical disk drive further has the infringement disk storage table of appending the infringement disks recorded on the above described infringement disk list, appending means of reproducing the above described infringement disk list every time the above described optical disk is mounted and on discovering the secret information corresponding to the infringement disk not recorded in the above described infringement disk storage table, appending the secret information corresponding to the above described discovered infringement disk to the above described infringement disk storage table, and the recording and reproduction prohibition means of prohibiting the recording and reproduction thereafter in the case where the secret information reproduced by the above described special reproduction means is recorded in the above described infringement disk storage table.

Thus, it is possible, as the infringement information recorded on the optical disks infringing on the license can be accumulated on the optical disk drive, to effectively eliminate the pirated optical disks without relying on the infringement information on the optical disk.

Furthermore, the seventh feature in the above fourth group is the optical disk drive constituting the license protection system of the optical disk and/or optical disk drive, characterized by having the reproduction means of reading the encrypted data key list from the optical disk on which the above described encrypted data key list is recorded after performing the second encrypting to one data key of performing the first encrypting to the user data to record it with a predetermined number of numbered license and generating a list of the same number of the encrypted data keys as the above described predetermined number, and the above described encrypted data keys corresponding to the infringement license keys stored in all the optical disk drives having infringed on the license conditions by the point in time in the above described list are changed to the nullified keys and the above described list is constituted to be searchable with the above described numbers, and the user data undergoes the first encrypting by the above described data key and is recorded as the encrypted data in the form of the reproduction-only, write-once or rewritable type, license key storage means of storing one or more license keys extracted according to the predetermined rule from the above described predetermined number of numbered license keys, control means of selecting the above described stored license keys one by one and searching for the encrypted data key corresponding to that number to determine whether or not it is the nullified key so as to proceed to a next decrypting process if it is not the nullified key or prohibit the recording and reproduction operation thereafter if the encrypted data keys corresponding to all the license keys in the above described license key storage means are the nullified keys, decrypting means of, when the decrypting is ordered by the above described control means, performing the second decrypting to the above described searched encrypted data key with the above described selected license key as the decrypting key and generating the data key, the reproduction means of reproducing the encrypted data from the above described optical disk and performing the first decrypting with the above described data key as the decrypting key to output the user data, and the recording means of, in the case where the above described optical disk has the recording area, inputting the user data and performing the first encrypting to the above described inputted user data with the above described data key as the encrypting key to record it in the recording area of the above described optical disk.

Thus, it is possible to effectively protect the license because only the non-pirated optical disk drive formally licensed and not nullified can implement normal recording and reproduction whereas the pirated optical disk drive cannot do so being unable to generate the encrypting key related to the recording and reproduction of the user data.

Furthermore, the eighth feature in the above fourth group is the above described optical disk drive according to the above seventh invention constituting the license protection system of the optical disk and/or optical disk drive, characterized in that the above described optical disk having the recording area is the optical disk further having recorded thereon the first infringement drive list on which the number of the infringement license key stored in the optical disk drive infringing on the license conditions are added as the infringement number, and the above described optical disk drive is the optical disk drive further having the infringement drive storage table capable of additionally recording the numbers of the infringement license keys stored in the optical disk drives infringing on the license conditions as the infringement numbers, the search means of reproducing the above described encrypted data key list and generating the number corresponding to the nullified key as the second infringement drive list every time the above described optical disk is mounted, the first infringement number updating means of reproducing the above described first infringement drive list if recorded on the above described optical disk on the above described mounting and appending to the above described first infringement drive list the infringement number stored in the above described infringement drive storage table and the above described second infringement drive list but not stored in the above described first infringement drive list, second infringement number updating means of appending to the above described infringement drive storage table the infringement number stored in the above described first infringement drive list and the above described second infringement drive list but not stored in the above described infringement drive storage table, and the control means of, in the case where the number of the license key stored in the above described license key storage means match with the infringement number stored in the above described first infringement drive list, the above described infringement drive storage table and the above described second infringement drive list, prohibiting the decrypting and encrypting operations by the above described matching license key.

Thus, it is possible to strengthen the license protection by effectively diffusing and settling the license infringement information in the optical disk system protected by the license.

The ninth feature in the above fourth group is the above described optical disk drive according to the above seventh or eighth invention constituting the license protection system of the optical disk and/or optical disk drive, characterized by further having the network connection means and the third infringement number updating means of taking in the latest infringement numbers provided by the License administrative organization from the above described network connection means and appending to the above described infringement drive storage table the infringement numbers which are not in the above described infringement drive storage table.

Thus, it is possible to further strengthen the license protection by effectively diffusing and settling the license infringement information in the optical disk system protected by the license without delay.

The tenth invention in the above fourth group invention is the above described optical disk drive according to the above seventh or eighth invention constituting the license protection system of the optical disk and/or optical disk drive, characterized that the above described optical disk is the optical disk further having recorded thereon the secret information in the form only reproducible by the special reproduction means, and the above described optical disk drive is the optical disk drive further having the special reproduction means of reading the above described secret information from the above described optical disk, the reproduction control means of prohibiting the recording and reproduction operation thereafter when the above described secret information is not correctly reproduced and generating the third encrypting key based on the above described secret information when the above described secret information is reproduced, the secret data key generation means of generating the first secret data key having performed the third encrypting to the above described decrypted data key with the data on the above described third encrypting key as the encrypting key or the second secret data key having performed the third encrypting to the above described third encrypting key with the data on the above described decrypted data key as the encrypting key, and the user data on the above described optical disk is recorded in one of the forms of the reproduction-only, write-once and rewritable types as the encrypted data to which the first encrypting has been performed with the above described first secret data key or the above described second secret data key as the encrypting key, and the decrypting key of the above described reproduction means is the above described first secret data key or the above described second secret data key, and in the case where the above described optical disk has the recording area, the encrypting keys of the above described recording means are the above described first secret data key and the above described second secret data key respectively.

Thus, it is possible to effectively eliminate the pirated optical disks and optical disk drives and protect the license because only the combination of the licensed optical disk and optical disk drive can generate the legitimate encrypting and decrypting keys and perform the recording and reproduction based on them.

The eleventh feature in the above fourth group is the above described optical disk drive according to the above tenth feature constituting the license protection system of the optical disk and/or optical disk drive, characterized in that the above described optical disk is the optical disk further having different contents of the above described secret information per predetermined number of the above described optical disks and having the secret information corresponding to the optical disks infringing on the license conditions recorded as the infringement disk list, and the above described optical disk drive further has the infringement disk storage table of appending the infringement disks recorded on the above described infringement disk list, appending means of reproducing the above described infringement disk list every time the above described optical disk is mounted and on discovering the secret information corresponding to the infringement disk not recorded in the above described infringement disk storage table, appending the secret information corresponding to the above described discovered infringement disk to the above described infringement disk storage table, and the recording and reproduction prohibition means of prohibiting the recording and reproduction thereafter in the case where the secret information reproduced by the above described special reproduction means is recorded in the above described infringement disk storage table.

Thus, it is possible to effectively protect the license by prohibiting the recording and reproduction on the optical disks infringing on the license.

(5) Furthermore, as for the above fifth group, the recording and reproduction method of the secret information to be recorded on the optical disk constituting the license protection system of the optical disk and optical disk drive is characterized in that it is comprised of a recording step of recording the information units while the above described secret information is comprised of one or more information bits, 1 bit of the above described information bit is recorded in a distributed state by setting as the information unit the minute information which is the pre-pit displacement of the pre-pit embossed on the above described optical disk and/or groove displacement of the groove of a specific length and using a plurality of the above described information units, the direction of the displacement of each of the above described information units is ordered by directional arrangement based on the predetermined rule, the direction of the displacement of each of the above described information units is set to become opposite according to whether the value of the above described information bit is "0" or "1" so that the above described pre-pit displacement is the minute displacement which will not impair the original information carried by the above described pre-pit, that is, the minute displacement of the radial edge of the above described pre-pit and/or the minute displacement of the rotative-direction edge and/or the minute change of the size of the above described pre-pit, and the above described groove displacement is the minute change which will not impair the original role of the above described groove, that is, the wobble minute displacement of the above described groove in the radial direction or the minute change of the groove width, and a reproduction step of determining whether the above described 1 bit is "0" or "1" while the above described minute information is reproduced by using the optical head, a total reflection light quantity signal of the optical spot of the above described optical head is used to detect the minute displacement of a rotative-direction edge of the above described pre-pit, the minute change of the size of the above described pre-pit or the minute displacement of the above described groove width, the push-pull signal of the optical spot of the above described optical head is used to detect the minute displacement of the radial edge of the above described pre-pit, and the reproduction is performed by the playback system using the above described push-pull signal or a differential signal for magnet-optical signal detection to detect the wobble minute displacement of the above described groove, each minute information of a plurality of information units corresponding to 1 bit of the information bit of the above described secret information is detected by the above described play back system to constitute a minute information arrangement, and the sum of products is calculated as to the value indicating the change of each element of the above described minute information arrangement and the value of the change of the direction of each element of the above described directional arrangement so as to determine whether the above described 1 bit is "0" or "1," and the above described method records and reproduces the secret information on the optical disk by using the above described recording step and the above described reproduction step.

Thus, it is possible to embed the secret information difficult for unlicensed pirate traders to analyze in the optical disk of which license should be protected and further allow only a formally licensed optical disk drive manufacturer to normally reproduce the secret information so as to effectively protect the license of the licensed optical disk and optical disk drive.

As described above, the invention disclosed in this specification and the drawings relates to the license wherein the person who newly developed the optical disk and/or optical disk drive becomes the licensor and licenses a third party as the licensee so as to permit the manufacturing and sales of the above described optical disk and/or optical disk drive by receiving the reasonable license fees.

To be more specific, the invention relates to the license protection system of the optical disk and/or optical disk drive, the optical disk, the optical disk drive and the recording and reproduction method of the secret information for the sake of protecting the rights of the licensor by making it difficult for an unlicensed person or a person not paying the license fees to create the pirated optical disk and the pirated optical disk drive.

As described above, the present invention can provide the optical disk capable of blocking the distribution of the illegitimate optical disks and/or optical disk drives more effectively than before.

The invention claimed is:

1. An optical disk comprising first information relating to unique information given to a specific optical disk manufacturer or a specific optical disk and second information of identifying an illegitimate optical disk manufacturer or an illegitimate optical disk are recorded in advance, wherein
said optical disk comprises an area in which encrypted data encrypted based on said first and second information is recorded in advance or an area capable of recording the data to be encrypted based on said first and second information.

2. The optical disk according to claim 1, wherein third information relating to the unique information given to a specific optical disk drive manufacturer or a specific optical disk drive is recorded on said optical disk in advance and
said third information is also used for said encrypting.

3. The optical disk according to claim 2 comprising an area capable of recording as fourth information the information corresponding to said optical disk manufacturer determined to be illegitimate or said optical disk drive determined to be illegitimate, said fourth information also being used for said encrypting.

4. An optical disk according to claim 1, said optical disk in an optical disk drive, comprising:
first information deciphering means of deciphering the first information relating to the unique information given to a specific optical disk manufacturer or specific optical disk recorded on the optical disk,
second information storage means of obtaining second information of identifying an illegitimate optical disk manufacturer or illegitimate optical disk,
first determination of determining whether or not said optical disk is illegitimate based on the deciphering results of said first information deciphering means and storage contents of said second information storage means, and control means of controlling reproduction of the data from said optical disk and/or recording of the data on said optical disk based on the determination result of said determination means.

5. An optical disk drive, comprising:

first information deciphering means of deciphering the first information relating to unique information given to a specific optical disk manufacturer or specific optical disk recorded on the optical disk, second information storage means of obtaining second information of identifying an illegitimate optical disk manufacturer or illegitimate optical disk, first determination of determining whether or not said optical disk is illegitimate based on the deciphering results of said first information deciphering means and storage contents of said second information storage means, and control means of controlling reproduction of the data from said optical disk and/or recording of the data on said optical disk based on the determination result of said determination means.

6. The optical disk drive according to claim 5, wherein said second information is information recorded on said optical disk in advance and/or obtained via the Internet.

7. The optical disk drive according to claim 5, comprising:

unique information storage means of storing apparatus unique information given to a specific optical disk manufacturer or a specific optical disk drive, and second determination means of reading said apparatus unique information and check it against third information on said apparatus unique information recorded on said optical disk in advance to determine whether or not said optical disk drive manufacturer is illegitimate or whether or not said optical disk drive is illegitimate, wherein said control means also utilizes the determination result of said second determination means.

8. The optical disk drive according to claim 7, comprising:

fourth information storage means of obtaining and storing the fourth information corresponding to the optical disk manufacturer or optical disk drive determined to be illegitimate, and updating means of updating and recording said fourth information in the data area of said optical disk based on storage contents of said fourth information storage means, wherein said second determination means makes said determination by also utilizing the processing result of said updating means.

* * * * *

UNITED STATES PATENT AND TRADEMARK OFFICE
CERTIFICATE OF CORRECTION

| | |
|---|---|
| PATENT NO. | : 7,339,869 B2 |
| APPLICATION NO. | : 10/479356 |
| DATED | : March 4, 2008 |
| INVENTOR(S) | : Kenzo Ishibashi et al. |

It is certified that error appears in the above-identified patent and that said Letters Patent is hereby corrected as shown below:

On the Cover Page, FIELD [56], References Cited, FOREIGN PATENT DOCUMENTS: "JP  2000-122537  A  4/2000" should read --JP 2000-122539 A--

Signed and Sealed this

Eighth Day of July, 2008

JON W. DUDAS
*Director of the United States Patent and Trademark Office*